(12) United States Patent
Satou et al.

(10) Patent No.: US 8,819,363 B2
(45) Date of Patent: Aug. 26, 2014

(54) DATA COPYING METHOD

(75) Inventors: Akira Satou, Kawasaki (JP); Kenichi Fujita, Kawasaki (JP); Koutarou Sasage, Kawasaki (JP); Atsushi Masaki, Kawasaki (JP); Hiroshi Shiomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 12/540,473

(22) Filed: Aug. 13, 2009

(65) Prior Publication Data

US 2009/0300306 A1    Dec. 3, 2009

Related U.S. Application Data

(63) Continuation-in-part of application No. 12/366,689, filed on Feb. 6, 2009, now abandoned.

(30) Foreign Application Priority Data

Feb. 12, 2008  (JP) .................................. 2008-030326
Feb. 10, 2009  (JP) .................................. 2009-028502

(51) Int. Cl.
*G06F 12/00* (2006.01)
*G06F 3/06* (2006.01)
*G06F 11/14* (2006.01)

(52) U.S. Cl.
CPC .............. *G06F 3/061* (2013.01); *G06F 3/0689* (2013.01); *G06F 3/065* (2013.01); *G06F 11/1466* (2013.01); *G06F 3/067* (2013.01); *G06F 3/0617* (2013.01); *G06F 3/0653* (2013.01)
USPC .................... 711/162; 711/154; 711/E12.103

(58) Field of Classification Search
None
See application file for complete search history.

(56) References Cited

U.S. PATENT DOCUMENTS 6,112,257 A     8/2000 Mason, Jr. et al.
6,477,169 B1 *  11/2002 Angle et al. ............. 370/395.42
(Continued)

FOREIGN PATENT DOCUMENTS

JP    9-325863      12/1997
JP    2001-517826    9/2001
(Continued)

OTHER PUBLICATIONS

IBackup. "IBackup for Windows." Frequently Asked Questions on Scheduling Backups Using IBackup for Windows, <http://www.ibackup.com/faqq4.htm>, retrieved Aug. 24, 2005. <http://web.archive.org/web/20050824093138/http://www.ibackup.com/faqq4.htm>.*

(Continued)

*Primary Examiner* — Matthew Bradley
*Assistant Examiner* — Daniel Bernard
(74) *Attorney, Agent, or Firm* — Staas & Halsey LLP

(57) ABSTRACT

A method for controlling a switch apparatus connectable to a host and a storage device including first and second areas, the method includes: establishing schedule of copying data stored in the first area of the storage device into the second area of the storage device; monitoring a state of access by the host to the storage device; carrying out copying the data stored in the first area into the second area while the monitored state of the access by the host allows copying of the data from the first area into the second area; and enhancing copying, if any portion of the data remains when a time set by the schedule is expired, the remaining portion of the data from the first area into the second area.

19 Claims, 16 Drawing Sheets

(56) References Cited

U.S. PATENT DOCUMENTS

| | | |
|---|---|---|
| 2004/0230794 A1* | 11/2004 | England et al. ............... 713/164 |
| 2005/0027956 A1* | 2/2005 | Tormasov et al. ............ 711/162 |
| 2005/0060356 A1* | 3/2005 | Saika ........................... 707/204 |
| 2005/0137732 A1* | 6/2005 | Chao et al. .................... 700/100 |
| 2005/0257062 A1* | 11/2005 | Ignatius et al. ............... 713/176 |
| 2006/0259724 A1* | 11/2006 | Saika ............................ 711/162 |
| 2007/0061513 A1* | 3/2007 | Tsumagari et al. ........... 711/114 |
| 2007/0078910 A1* | 4/2007 | Bopardikar ................... 707/204 |
| 2007/0088976 A1 | 4/2007 | Daikokuya et al. |
| 2007/0168404 A1 | 7/2007 | Nakamura et al. |
| 2008/0229037 A1* | 9/2008 | Bunte et al. ................... 711/162 |
| 2008/0263551 A1* | 10/2008 | Ali et al. ....................... 718/102 |
| 2008/0266698 A1* | 10/2008 | Shibayama et al. ............ 360/69 |
| 2009/0300633 A1* | 12/2009 | Altrichter et al. ............. 711/162 |
| 2011/0246730 A1* | 10/2011 | Yoshida et al. ............... 711/156 |

FOREIGN PATENT DOCUMENTS

| | | |
|---|---|---|
| JP | 2002-182863 | 6/2002 |
| JP | 2003-140946 | 5/2003 |
| JP | 2007-94994 | 4/2007 |
| JP | 2007-193451 | 8/2007 |
| JP | 2007-193839 | 8/2007 |

OTHER PUBLICATIONS

Japanese Office Action mailed Mar. 13, 2012 issued in corresponding Japanese Patent Application No. 2009-028502.

Japanese Office Action mailed Mar. 12, 2013 for corresponding Japanese Application No. 2009-028502.

Japanese Office Action issued Oct. 9, 2012 in corresponding Japanese Patent Application No. 2009-028502.

Japanese Office Action mailed Nov. 5, 2013 in corresponding Japanese Application No. 2009-28502.

* cited by examiner

| COPY PROCESS PRIORITY | MESSAGE |
|---|---|
| 1 ~ 3 | Host I/O Response Having Higher Priority |
| 4 ~ 6 | Standard Priority |
| 7 ~ 9 | Copy Process Having Higher Priority |
| Above 9 | Copy Process May Not Be Completed Within The Copy Operation Time Even If The Copy Process Has Higher Priority |

800

FIG. 7
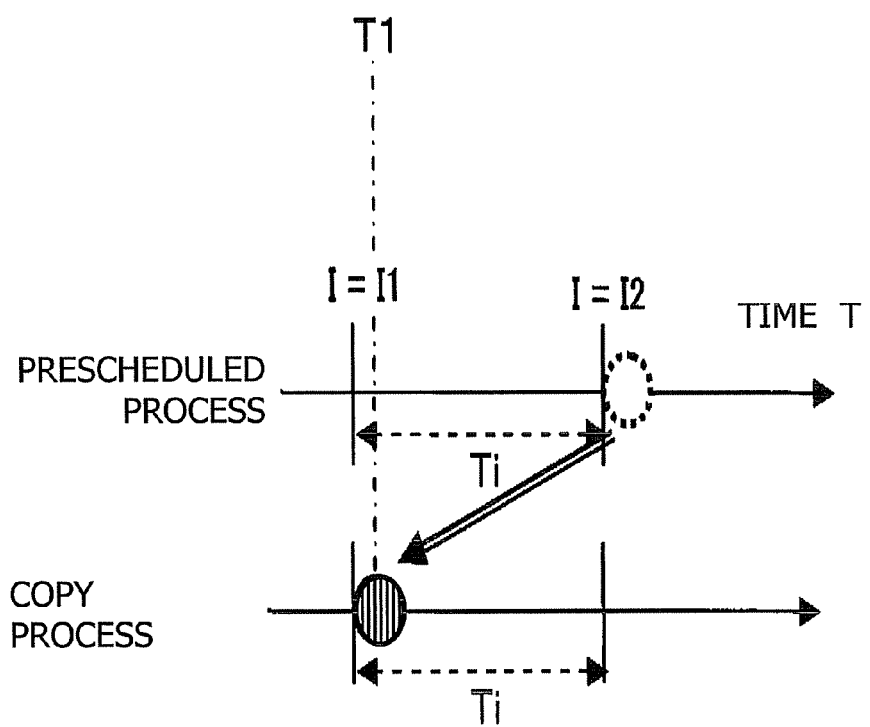
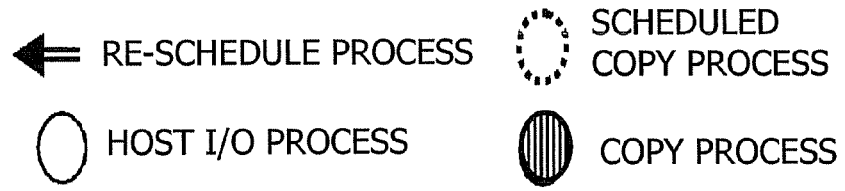

FIG. 11

| USER | VIRTUAL SWITCH |
|---|---|
| 1. Request Copy Process For Virtual Disk | |
| 2. Instruct Copy Operation Time | 3. Obtain Copy Operation Time |
| | 4. Obtain Copy Amount Per Copy Operation |
| | 5. Obtain Entire Copy Amount |
| | 6. Calculate Interval |
| | 7. Display Priority Of Copy Process To User |
| 8. Recognize Priority Level And Input Copy Start Instruction | |
| | 9. Perform Copy Process |
| | 10. Complete Copy Process At Scheduled Time |

DATA COPYING METHOD

CROSS-REFERENCE TO RELATED APPLICATIONS

This application is a continuation-in-part of a U.S. patent application titled "DATA COPYING METHOD", having application Ser. No. 12/366,689, filed on Feb. 6, 2009 (now abandoned). This application is based upon and claims the benefit of priority of the prior Japanese Patent Application No. 2008-030326, filed on Feb. 12, 2008, and the prior Japanese Patent Application No. 2009-028502, filed on Feb. 10, 2009, the entire contents of which are incorporated herein by reference.

FIELD

The embodiments discussed herein are related to a data copying method of a network system.

BACKGROUND

Japanese Laid-open Patent Publication Nos. 2007-94994 and 2007-193451 disclose virtual switches for virtualizing an actual (physical) disk at a network layer (switch layer) and providing users with a virtual disk independent of a host apparatus and a type of the actual disk.

FIG. 16 illustrates a known storage system 80. As illustrated in FIG. 16, a virtual switch 81 in the storage system 80 is arranged between a plurality of host apparatuses 82-1 through 82-3 (three host apparatuses in FIG. 16) and a plurality of actual disks 83-1 and 83-2 (two physical disks in FIG. 16).

The virtual switch 81 connects to the plurality of host apparatuses 82-1 through 82-3 and the plurality of physical disks 83-1 and 83-2 via a communication line of fibre channel (FC). The virtual switch 81 also connects to a management terminal 84 via a communication line (data transfer system) such as local area network (LAN).

The virtual switch 81 performs major functions by assigning a logical volume of any capacity sliced from each of the physical disks 83-1 and 83-2 to each of the host apparatuses 82-1 through 82-3. One major function (referred to as virtual disk function) is to provide users with at least one of the virtual disks (four virtual disks 85-0 through 85-3 in FIG. 16), independent of the host apparatuses 82-1 through 82-3 and the type of physical disks 83-1 and 83-2. Another major function (referred to as copy function) is to execute a copy process by splitting the copy process into a plurality of unit copy operations, each unit copy operation including a predetermined size, and performing the unit copy operations using a resource within the virtual switch 81 only, without using resources in the host apparatuses 82-1 through 82-3 (such as central processing units (CPUs) and memories).

The copy process includes backing up or moving data of a physical disk (for example, the physical disk 83-1 in FIG. 16) as a copy source onto a physical disk as a copy destination (for example, the physical disk 83-2 in FIG. 16) in accordance with content input to the management terminal 84.

The copy process based on the copy function is executed by a redundant arrays of inexpensive disks (RAID) device forming the physical disks 83-1 and 83-2 when the data of the physical disks 83-1 and 83-2 is periodically backed up or when data is moved from one of the physical disks 83-1 and 83-2 to a new disk when the one of the physical disks 83-1 and 83-2 is replaced with the new disk.

SUMMARY

According to an aspect of the embodiments, a method for controlling a switch apparatus connectable to a host and a storage device including first and second areas, the method includes: establishing schedule of copying at least a part of data stored in the first area of the storage device into the second area of the storage device; monitoring a state of access by the host to the storage device; carrying out copying the at least a part of the data stored in the first area into the second area while the monitored state of the access by the host allows copying of the data from the first area into the second area; enhancing copying, if any portion of the at least a part of the data remains when a time set by the schedule is expired, the remaining portion of the at least a part of the data from the first area into the second area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 illustrates an example of a re-schedule process performed by a re-schedule processor in the virtual storage system in accordance with the first embodiment of the present invention;

FIG. 11 illustrates a copy process in the virtual storage system in accordance with the first embodiment of the present invention;

DESCRIPTION OF EMBODIMENTS

As described previously, any other operation may not be interrupted by the copy process when it is executed. To this end, the copy process may not lower host I/O response of each of the host apparatuses 82-1 through 82-3.

For example, a user schedules the copy process in accordance with intervals manually selected from a plurality of levels (for high-speed copying, medium-speed copying, and low-speed copying). The unit copy operations are performed at the specified intervals at the scheduled timings.

More specifically, if the user sets the copy process priority to a lower level by specifying long intervals (for the low-speed copying, for example), the host I/O response has a higher priority. A speed reduction in the host I/O response responsive to the operation of the copy process is thus reduced.

The copy operations are performed at the scheduled timing. The host I/O response has a higher priority when it is not the scheduled timing of the unit copy operation. At the scheduled timing of the unit copy operation, however, the unit copy operation has a higher priority, and the host I/O response is kept waiting.

The host I/O response is thus lowered at the timing of the each unit copy operation.

There is a need for completing a copy process as scheduled by the user. The above-described technique simply allows the user to raise or lower a priority level of the copy process by selecting one from a plurality of preset intervals and does not allow the user to directly specify the end time of the copy process.

The end time of the copy process remains unknown. If the copy process is scheduled at long intervals with the host I/O response set at a higher priority (i.e., the copy process set at a lower priority), there is a possibility that the copy process is not completed before the time specified by the user.

Conversely, if the copy process is scheduled at short intervals with the end time of the copy process unknown (with the copy process set at a higher priority level), the priority level of the host I/O response may remain lowered even if the copy process is completed before the time specified by the user. It is thus difficult to efficiently perform the copy process.

If the copy process is performed using the RAID device, the copy process is performed only between storages of the same type.

The embodiments can reduce a speed reduction in a host I/O response due to the operation of a copy process and to complete the copy process on time as scheduled by a user.

Furthermore, there is a requirement that a host I/O response not be lowered on the storage system in principle, and there is also a requirement that a host I/O response be processed with a higher priority over a copy process if the host I/O response takes place.

The embodiments of the present invention are described below with reference to the drawings.

Figure 1:
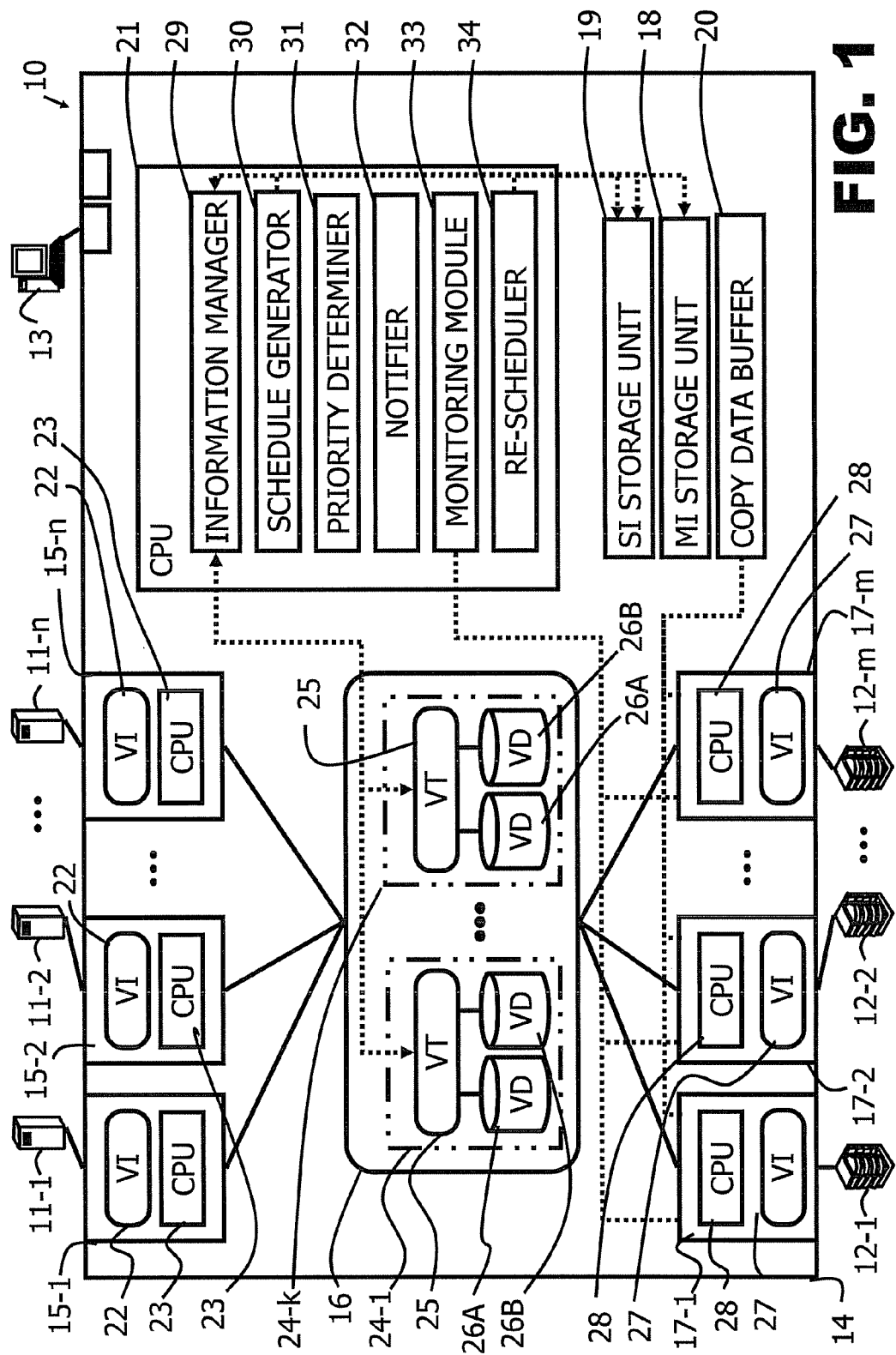
FIG. 1 diagrammatically illustrates a virtual storage system in accordance with a first embodiment of the present invention.

FIG. 1 diagrammatically illustrates a structure of a virtual storage system 10 in accordance with the first embodiment of the present invention.

Referring to FIG. 1, the virtual storage system 10 of the first embodiment of the present invention includes at least one host apparatus (high level apparatus) 11-1 through 11-n (n being a natural number), a plurality of physical disks (first and second storage areas) 12-1 through 12-m (redundant arrays of inexpensive disk (RAID) devices (m being a natural number), a management terminal 13, and a virtual switch (information processing apparatus) 14.

In the virtual storage system 10, the virtual switch 14 is arranged between the plurality of host apparatuses 11-1 through 11-n and the plurality of physical disks (storage devices) 12-1 through 12-m.

The virtual switch 14 is connected to each of the plurality of host apparatuses 11-1 through 11-n and the plurality of physical disks 12-1 through 12-m via a communication line such as fibre channel (data transfer system). The virtual switch 14 is also connected to the management terminal 13 via a communication line such as a local area network (LAN).

In the virtual storage system 10 of the first embodiment of the present invention, the virtual switch 14 virtualizes and generally manages the physical disks 12-1 through 12-m. The virtual switch 14 then assigns a virtual volume to each of the host apparatuses 11-1 through 11-n. For example, with each of the host apparatuses 11-1 through 11-n accessing an assigned virtual volume (storage units 24-1 through 24-k to be discussed later), the virtual switch 14 performs a host I/O response (post I/O process) to the physical disk 12. The physical disks 12-1 through 12-m are transparent to the host apparatuses 11-1 through 11-n.

The host I/O response refers to a data transfer process performed between each of the host apparatuses 11-1 through 11-n and each of the physical disks 12-1 through 12-m, and includes a host-side read process and a host-side write process. The host-side read process is a process of one of the host apparatuses 11-1 through 11-n for reading data from one of the physical disks 12-1 through 12-m. In the host-side read process, data is transferred from one of the physical disks 12-1 through 12-m to one of the host apparatuses 11-1 through 11-n via the virtual switch 14. The host-side write process is a process of one of the host apparatuses 11-1 through 11-n for writing data on one of the physical disks 12-1 through 12-m. Data is transferred from one of the host apparatuses 11-1 through 11-n to one of the physical disks 12-1 through 12-m via the virtual switch 14.

In the discussion that follows, reference numerals 11-1 through 11-n are used to individually identify the plurality of host apparatuses, and reference numeral 11 is used to refer to one host apparatus that represents all the host apparatuses.

The reference numerals 12-1 through 12-m are used to individually identify the plurality of physical disks, and reference numeral 12 is used to refer to one physical disk that represents all the physical disk.

In the discussion that follows, the host I/O response refers to both the host-side read process and the host-side write process.

The management terminal 13 manages a variety of information in the virtual storage system 10 by accessing the virtual switch 14 to be detailed later. The management terminal 13 includes, for example, a display (not illustrated) functioning as a graphic user interface (GUI), and an input unit for inputting information needed to execute the copy process to be discussed later, and a copy instruction (also referred to as a copy start instruction) for starting the copy process.

The information used to execute the copy process refers to copy source specifying information, copy destination specifying information, and specified time for the copy process (hereinafter referred to as copy operation time). The copy source specifying information is an address of the physical disk 12 as a copy source, and the copy destination specifying information is an address of the physical disk 12 of a copy destination. The copy operation time is time available for copying until the end of copying.

Observing a GUI screen, the user may input to the input unit of the management terminal 13 the copy source specifying information, the copy destination specifying information, and the copy operation time as information needed for the copy process. The management terminal 13 then transmits these pieces of input information to a schedule information generator 30 to be discussed later.

The copy operation time may be directly input by the user as time available for copying. Alternatively, the user may input expected copy end time, and the management terminal 13 may calculate the copy operation time by subtracting the present time from the expected copy end time.

When the user inputs the copy start instruction to the input unit of the management terminal 13 later on, the management terminal 13 transmits the copy start instruction to the schedule information generator 30, a second processor (hereinafter referred to as a copy source second processor) 17 corresponding to the copy source specifying information and a second processor (hereinafter referred to as a copy destination second processor) 17 corresponding to the copy destination specifying information.

The virtual switch 14 virtualizes the physical disk 12 at a network layer (switch layer), and supplies the user with a virtual disk 26 (VD) that is independent of the host apparatus 11 and the physical disk 12. Referring to FIG. 1, the virtual switch 14 constructed as a computer includes at least one first processor (first port) 15-1 through 15-n, a virtual storage 16, a plurality of second processor (copy process executing unit or second port) 17-1 through 17-m, a mapping information storage unit 18 (MI storage unit), a schedule information storage unit 19 (SI storage unit), a copy data buffer 20, and a central processing unit (CPU) 21.

The virtual storage 16 includes at least one storage unit, 24-1 through 24-k (k being a natural number).

The first processors 15-1 through 15-n are respectively connected to the host apparatuses 11-1 through 11-n on a one-to-one correspondence basis, and connected to the virtual storage 16 in a manner such that accessing to each of the storage units 24-1 through 24-k is possible.

As illustrated in FIG. 1, the first processor 15-1 is connected to the host apparatus 11-1, the first processor 15-2 is connected to the host apparatus 11-2, . . . , and the first processor 15-n is connected to the host apparatus 11-n.

The second processors 17-1 through 17-m are connected to the virtual storage 16 in a manner such that accessing to each of the storage units 24-1 through 24-k is possible. The second processors 17-1 through 17-m are respectively connected to the physical disks 12-1 through 12-m on a one-to-one correspondence basis.

As illustrated in FIG. 1, the second processor 17-1 is connected to the physical disk 12-1, the second processor 17-2 is connected to the physical disk 12-2, . . . , and the second processor 17-m is connected to the physical disk 12-m.

In the discussion that follows, the reference numerals 15-1 through 15-n are used to individually identify the plurality of first processors, and reference numeral 15 is used to refer to one first processor that represents all the first processors.

The reference numerals 17-1 through 17-m are used to individually identify the plurality of second processors, and reference numeral 17 is used to refer to one second processor that represents all the second processors.

The reference numbers 24-1 through 24-k are used to individually identify the plurality of storage units, and reference numeral 24 is used to refer to one storage unit that represents all the storage units.

One first processor 15 is fixed to one port (represented by reference characters "p-0" through "p-7" in FIG. 2), and a virtual initiator (VI) 22 and a CPU 23 in the first processor 15 allows a data transfer process to be performed between the corresponding host apparatus 11 and virtual storage 16 (for example, virtual target (VT) 25 to be discussed later).

The storage unit 24 includes the virtual target (VT) 25 produced by the virtual switch 14 and a plurality of virtual disks (two virtual disks 26A and 26B in FIG. 1).

The VT 25 is designed to be accessed by the host apparatus 11 via the first processor 15. The VT 25 functions as a target when the host apparatus 11 accesses the virtual disk 26.

In the discussion that follows, the reference numerals 26A and 26B are used to identify the plurality of virtual disks, and reference number 26 is used to refer to one virtual disk that represents all the virtual disks.

The number of VTs 25, the number and size of virtual disks 26, a RAID type, a physical disk to be assigned, and concatenation of the physical disks may be set to any values by the user.

Figure 2:
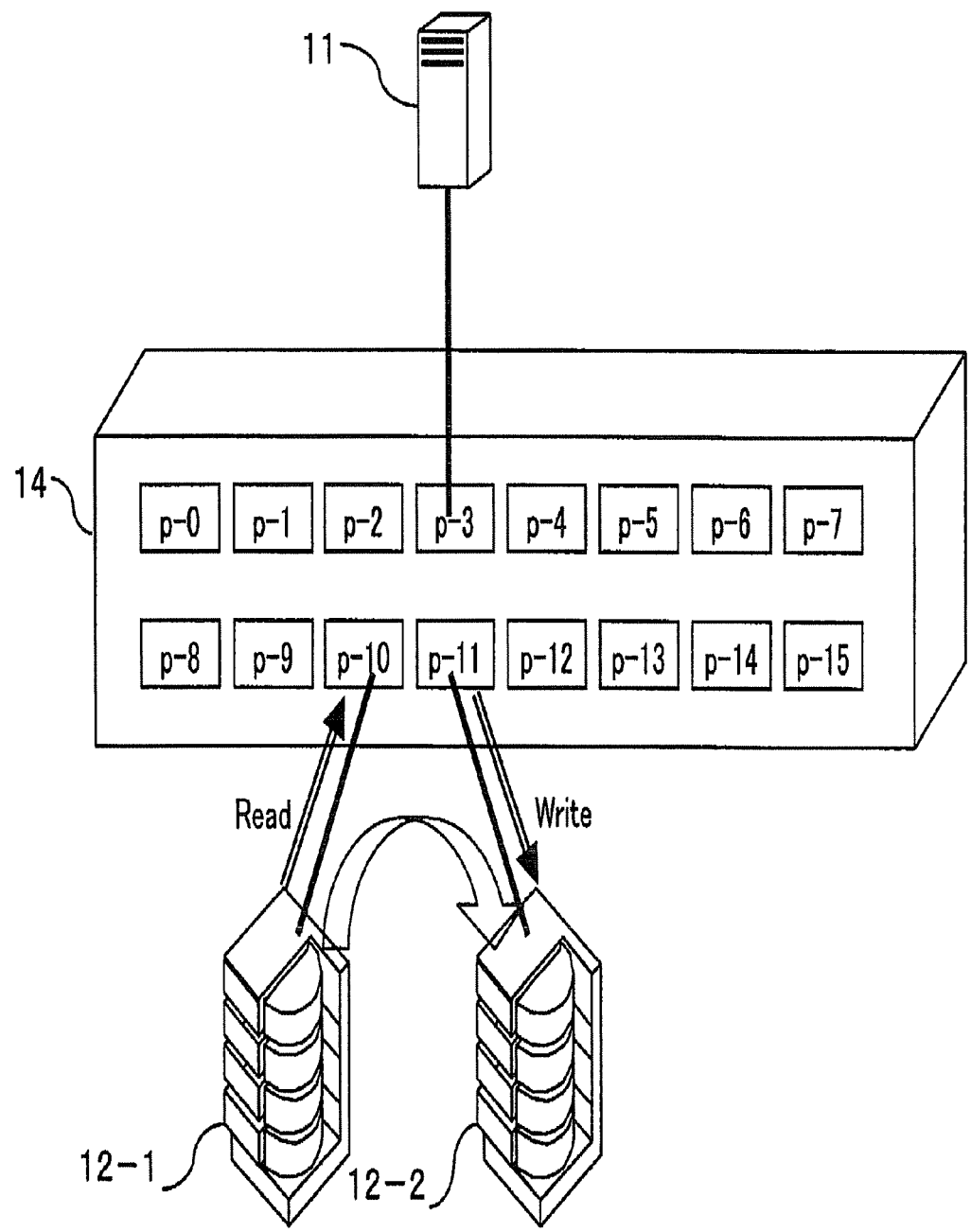
FIG. 2 illustrates one example of a copy process in the virtual storage system in accordance with the first embodiment of the present invention.

One second processor 17 is fixed to one respective port (represented by reference characters "p-8" through "p-15" in FIG. 2). VI 27 and CPU 28 in the second processor 17 allows a data transfer process to be performed between the corresponding physical disk 12 and the virtual switch 14. For example, in response to a request from a virtual configuration information manager 29 to be discussed later, the VI 27 issues a request for the host-side read process and a request for the host-side write process to the physical disk 12.

The virtual switch 14 assigns a logical volume of any capacity spliced from the physical disk 12 to the host apparatus 11. The virtual switch 14 has a function of providing a user with the virtual disk 26 independent of the host apparatus 11 and the type of the physical disk 12. This function is also referred to as a virtual disk function.

In addition to the virtual disk function, the virtual switch 14 also has a function of executing a copy process by splitting the copy process into a plurality of unit copy operations using resources only within the virtual switch 14 rather than using resources of the host apparatus 11 (such as CPU and memory). This function is also referred to as a copy function.

The copy process refers to a process in which data on the physical disk (hereinafter referred to as a copy source physical disk) 12 (first storage area such as the physical disk 12-1 of FIG. 1) corresponding to the copy source specifying information is backed up or moved to the physical disk (hereinafter referred to as a copy destination physical disk) 12 (second storage area such as the physical disk 12-2 of FIG. 1) corresponding to the copy destination specifying information. For example, at least a part of data stored in the first area of the storage device is copied into the second area of the storage device in the copy process (copying).

Figure 3:
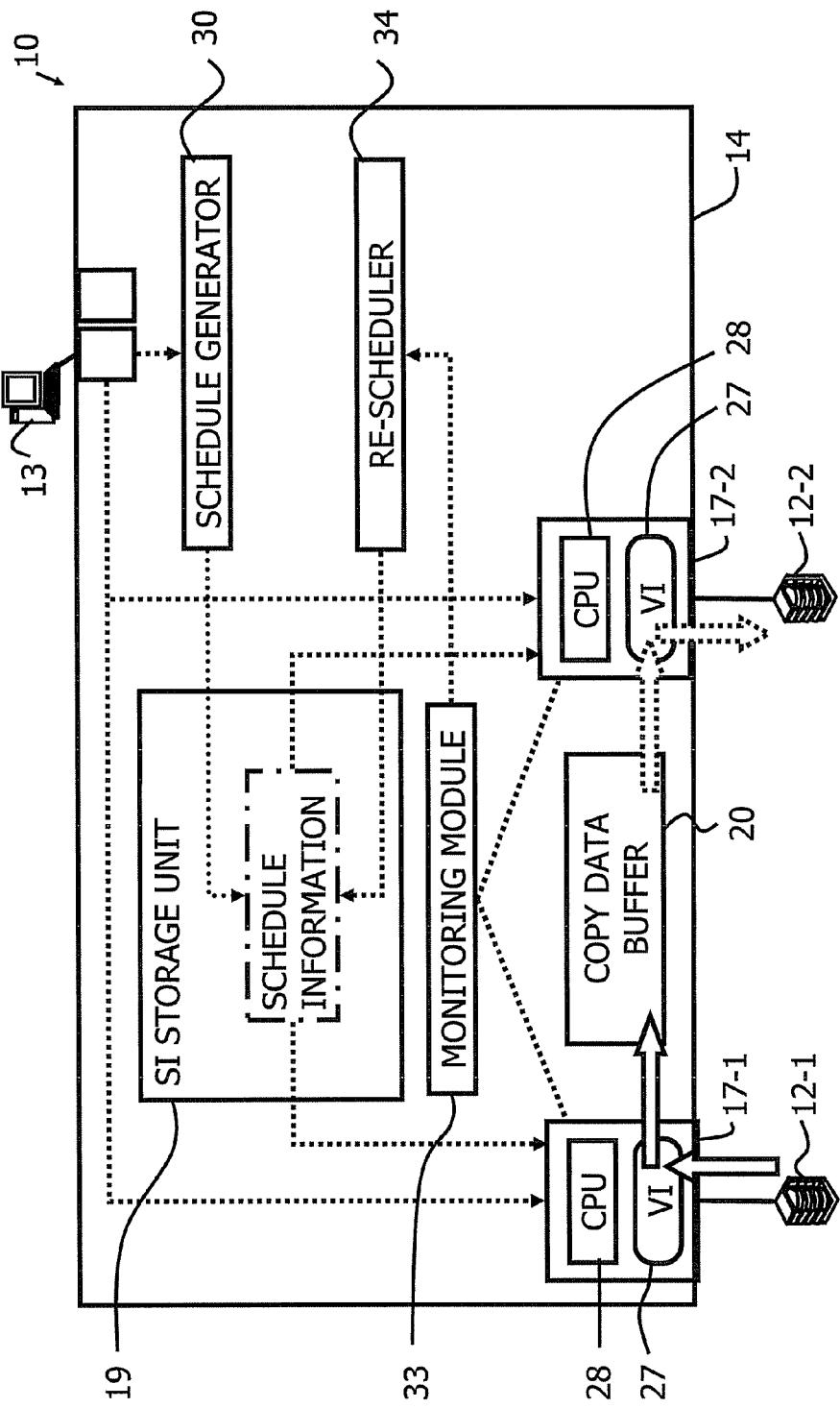
FIG. 3 illustrates one example of the copy process in the virtual storage system in accordance with the first embodiment of the present invention.

FIGS. 2 and 3 illustrate an example of a computer process in the virtual storage system in accordance with the first embodiment of the present invention.

As illustrated in FIGS. 2 and 3, the copy process is performed from the copy source physical disk 12-1 to the copy destination physical disk 12-2. The second processor (hereinafter referred to as a copy source second processor) 17-1 corresponding to the copy source physical disk 12-1 performs a read process. More specifically, the copy source second processor 17-1 reads data on the copy source physical disk 12-1 via a port p-10 in a plurality of cycles in accordance with schedule information stored on the schedule information storage unit 19 and then stores temporarily the read data onto the copy data buffer 20. Then, the second processor (hereinafter referred to as a copy destination second processor) 17-2 corresponding to the copy destination physical disk 12-2 performs a write process. More specifically, the copy destination second processor 17-2 reads data stored on the copy data buffer 20 in a plurality of cycles in accordance with the schedule information stored on the schedule information storage unit 19 and writes the read data onto the copy destination physical disk 12-2 via the port p-11.

In the copy process performed from the copy source physical disk 12-1 to the copy destination physical disk 12-2, the copy source second processor 17-1 performs the read process and the copy destination second processor 17-2 performs the write process. The two second processors 17-1 and 17-2 function as the copy process executing unit.

In other words, the virtual switch 14 performs data transfer as the copy process between the virtual switch 14 and the physical disk 12 using no resource in the host apparatus 11 at all.

In the discussion that follows, a process related to the host I/O response is referred to as a host-side write process or a host-side read process, and a process related to the copy process is referred to as a write process or a read process.

For convenience of explanation, the copy process refers to both the read process and the write process.

The mapping information storage unit 18 stores mapping information that maps the virtual disk 26 to the physical disk 12 as illustrated in FIG. 1. The mapping information stored on the mapping information storage unit 18 is used when the virtual configuration information manager 29 determines the physical disk 12 to be actually accessed.

The schedule information storage unit 19 stores schedule information generated by the schedule information generator 30. The schedule information stored on the schedule information storage unit 19 is used when the copy source second processor 17 performs the copy process. The schedule information and the copy process performed by the second processor 17 in accordance with the schedule information will be described later.

The copy data buffer 20 buffers data read by the second processor 17 as the copy source when the copy process is performed from the physical disk 12 as a copy source to the physical disk 12 as a copy destination. The copy data buffer 20 may include a memory.

The CPU 21 in the virtual switch 14 performs a variety of numerical calculations, information processing, device control, etc. The CPU 21 functions as the virtual configuration information manager 29, the schedule information generator 30, a priority determiner 31, a notifier 32, a data transfer process monitoring module (data transfer amount monitoring module) 33, and a re-scheduler 34.

In response to the VT 25 accessed by the host apparatus 11, the virtual configuration information manager 29 determines the physical disk 12 to be actually accessed. For example, when the host apparatus 11 accesses any VT 25, the virtual configuration information manager 29 determines the physical disk 12 corresponding to the VT 25 accessed by the host apparatus 11 in accordance with the mapping information stored on the mapping information storage unit 18.

Figure 4:
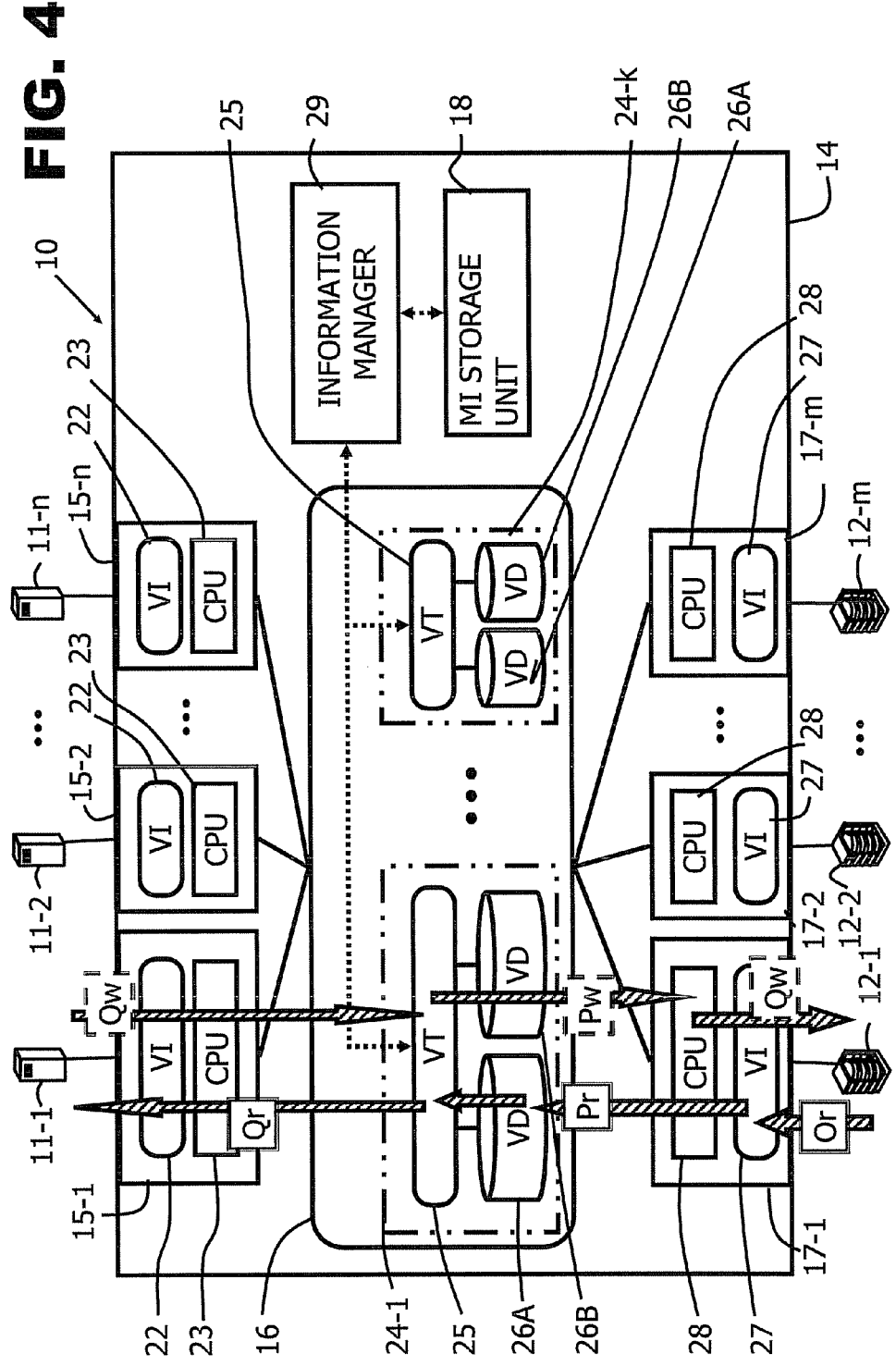
FIG. 4 illustrates one example of a process performed when a host apparatus accesses a virtual switch in the virtual storage system in accordance with the first embodiment of the present invention.

FIG. 4 illustrates a process example performed when the host apparatus accesses the virtual switch 14 in the virtual storage system 10 of the first embodiment of the present invention.

More specifically, the host apparatus 11-1 accesses the VT 25 in the storage unit 24-1 via the first processor 15-1 as illustrated in FIG. 4. When the host-side write process is performed on the virtual disks 26A and 26B in the storage unit 24-1, the virtual configuration information manager 29 references the mapping information stored on the mapping information storage unit 18 in response to the write instruction (command and address) from the host apparatus 11-1, and determines a physical disk 12-1 corresponding to the VT 25 in the storage unit 24-1 and a destination address on the physical disk 12-1.

The VT 25 in the storage unit 24-1 issues a request for a host-side write process to the VI 27 in the second processor 17-1 corresponding to the physical disk 12-1 determined by the virtual configuration information manager 29. The VT 25 in the storage unit 24-1 then reads data (see reference characters "Ow" in FIG. 4) written from the host apparatus 11-1 on the virtual disks 26A and 26B in the storage unit 24-1 and then transfers the read data to the VI 27 in the second processor 17-1 (see reference characters "Pw" in FIG. 4). The second processor 17-1 writes the data on the second processor 17-1 onto the physical disk 12-1 (see reference characters "Qw" in FIG. 4).

As illustrated in FIG. 4, the host apparatus 11-1 may perform the host-side read process on the virtual disks 26A and 26B in the storage unit 24-1 by accessing the VT 25 in the storage unit 24-1 via the first processor 15-1. The virtual configuration information manager 29 references the mapping information stored on the mapping information storage unit 18 in response to the read instruction (command and address) from the host apparatus 11-1 and determines a physical disk 12-1 corresponding to the VT 25 in the storage unit 24-1 and a read destination address of the physical disk 12-1.

The VT 25 in the storage unit 24-1 issues a request for the host-side read process to the VI 27 in the second processor 17-1 corresponding to the physical disk 12-1 determined by the virtual configuration information manager 29. When the request for the host-side read process is issued to the VI 27, the second processor 17-1 reads data from the requested physical disk 12-1 (see reference characters "Or" in FIG. 4) and transfers the read data to the VT 25 in the storage unit 24-1 (see reference characters "Pr" in FIG. 4). The storage unit 24-1 writes the data on the VT 25 onto the virtual disks 26A and 26B in the storage unit 24-1.

When the data is written onto the virtual disks 26A and 26B in the storage unit 24-1, the VI 22 in the first processor 15-1 read the data from the virtual disks 26A and 26B in the storage unit 24-1 and transfers the read data to the host apparatus 11-1 (see reference characters "Qr" in FIG. 4).

Figure 5:
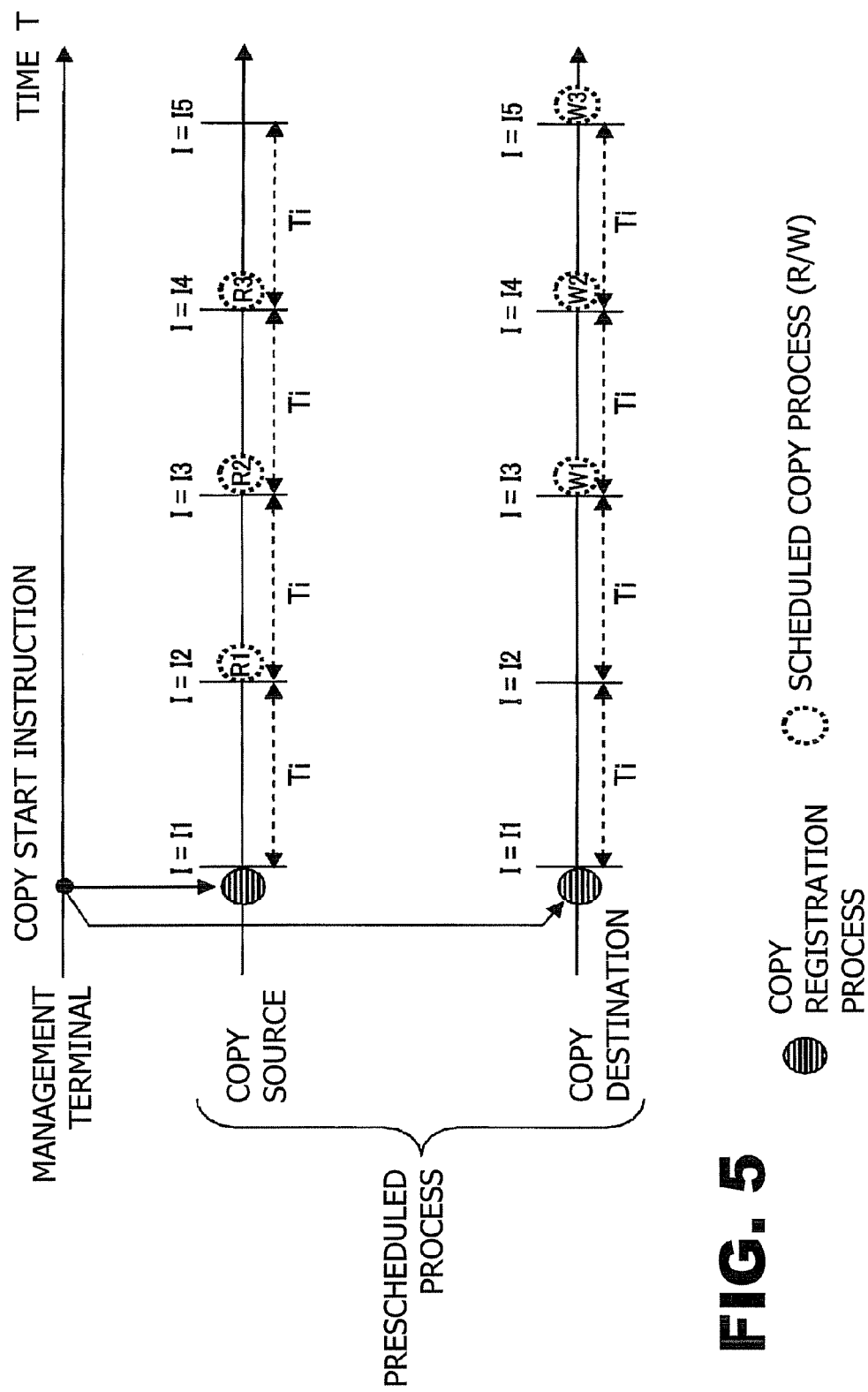
FIG. 5 illustrates content of schedule information produced by a schedule information generator in the virtual storage system in accordance with the first embodiment of the present invention.

FIG. 5 illustrates content of the schedule information generated by the schedule information generator 30 in the virtual storage system 10 in accordance with the first embodiment of the present invention.

Referring to FIG. 1, the schedule information generator 30 generates (establishes) beforehand the schedule information so that the copy process is split uniformly among a plurality of unit copy operations and is executed (this process is also referred to as prescheduling). When information needed for executing the above-described copy process is input to the input unit in the management terminal 13, the schedule information generator 30 calculates intervals Ti in accordance with the following equation (1) based on the copy operation time X specified by the user, a size of data in the physical disk 12 as a copy source (overall copy amount Y), and a size of unit data for a single unit copy operation (copy amount for one cycle Z fixed to each apparatus):

$$Ti = XZ/Y \quad (1)$$

If the copy process is performed with the copy operation time X being 300 (minutes), the overall copy amount Y being 40960 (Mbytes), and the copy amount Z for a single unit copy operation being 16 (Mbytes), the interval Ti of 7.07 (seconds) results.

The schedule information generator 30 thus functions as an interval calculator (not shown) that calculates the interval Ti based on the copy operation time X, the overall copy amount Y, and the copy amount per copy cycle Z. The user or the like can modify the copy amount Z to any amount using the management terminal 13.

When the copy start instruction is input to the input unit in the management terminal 13, the schedule information generator 30 generates the schedule information for the copy source second processor 17 to execute the copy process. The copy source second processor 17 thus performs the unit copy operations at the intervals Ti, thereby copying data of a constant data size (unit data size) at each unit copy operation. The generation of the above-described schedule information and the storage of the schedule information are also collectively referred to as a copy registration process.

More specifically, as illustrated in FIGS. 2 and 3, the copy process may be performed from the copy source physical disk 12-1 to the copy destination physical disk 12-2. As illustrated in FIG. 5, when the copy start instruction is input to the input unit in the management terminal 13, the schedule information generator 30 generates the schedule information for the second processor 17-1 as the copy source to perform the read process. The schedule information is used for the second processor 17-1 as the copy source to execute each unit copy operation (also referred to as a unit read process) R1-R3 at constant intervals Ti. The schedule information generator 30 also generates the schedule information for the copy destination second processor 17-2 to perform the write process. The schedule information is used for the second processor 17-2 as the copy destination to execute each unit copy operation (also referred to as a unit write process) W1-W3 at constant intervals Ti. The copy registration process is thus performed.

In the copy registration process for the write process, the schedule information generator 30 generates the schedule information so that the unit write process is executed at a timing later than the timing prescheduled in response to the unit read process.

It is noted that the schedule information is constructed by mapping planned execution time, data size, status, etc. of the unit copy operation to, for example, an LBA (Logical Block Addressing) indicating a storage location of data related to the unit copy operation. Also, the status is information indicating a process status of the unit copy operation, and for example, is information indicating any of a pre-copy state (prior to copying), a copy in progress state, and a copy completed state.

With reference to FIG. 5, the schedule information generator 30 generates the schedule information so that a first unit write operation W1 at the copy destination is performed at a timing I3 an interval Ti after a timing I2 prescheduled for a first read operation R1 at the copy source. Similarly, the schedule information generator 30 generates the schedule information so that second and third unit write operations W2 and W3 at the copy destination are performed at timings I4 and I5 respectively an interval Ti after timings I3 and I4 prescheduled for second and third unit read operations at the copy source.

In the discussion that follows, unit copy operation includes a unit read operation and a unit write operation for convenience of explanation.

Figures 6A, 6B:
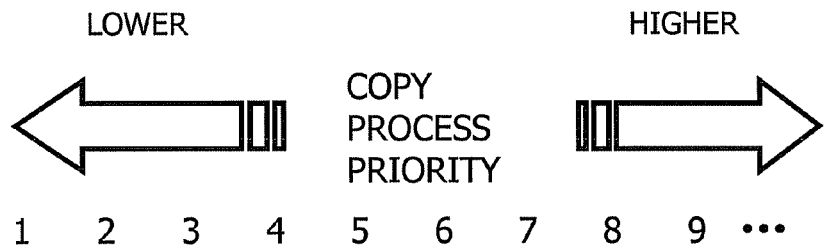
FIGS. 6A and 6B illustrate a priority level determined by a priority determiner in the virtual storage system in accordance with the first embodiment of the present invention.

FIGS. 6A and 6B illustrate a priority level determined by the priority determiner 31 in the virtual storage system 10 in accordance with the first embodiment of the present invention.

The priority determiner 31 automatically determines a priority level of the copy process (copy priority) with respect to the host I/O response in the middle of the copy process, based on the Ti calculated by the schedule information generator 30. For example, the priority determiner 31 automatically selects, from a plurality of indexes preset depending on the length of intervals, an index matching the interval Ti calculated by the schedule information generator 30. The priority determiner 31 thus determines the priority level.

The indexes indicating the priority levels may be a plurality of level values based on the relationship that the longer the intervals of unit copy operations, the lower the priority of the copy process (i.e., the host I/O response set at a higher priority level).

With reference to FIGS. 6A and 6B, the priority determiner 31 uses an integer of 1 or greater as an index of the copy priority. As illustrated in FIG. 6A, the copy process increases priority with the increasing number from 1 representing the lowest priority.

FIG. 6B is an example of list 800 of priority level. With reference to 6B, the priority determiner 31 provides a number of 1 to 3 as a priority index with the host I/O response including a higher priority, a number of 4 to 6 as a standard priority index, and a number of 7 to 9 with the copy process including a higher priority. The priority determiner 31 also provides a number 9 as a priority index at which the copy process may not be completed within the copy operation time even if the copy process has a higher priority.

The notifier 32 notifies of the schedule information generated by the schedule information generator 30. The notifier 32 transmits to the management terminal 13 the priority index determined by the priority determiner 31, and displays a message responsive to the priority level (see FIGS. 6A and 6B) on a display (GUI screen) of the priority determiner 31. The notifier 32 thus notifies the user of the priority level at which the copy process is to be performed under the condition input to the input unit in the management terminal 13.

If the priority determiner 31 determines a priority index above 9, the notifier 32 displays a message on the GUI screen requesting the user to re-input (re-specify) a copy operation time of the copy process.

The user recognizes the message (priority level) displayed on the GUI screen. Upon deciding to perform the copy process at this priority level, the user inputs an instruction to start the copy process to the input unit in the management terminal 13. In response to the input of the instruction to start the copy process, the management terminal 13 transmits the input instruction to the schedule information generator 30, the second processor 17 as the copy source and the second processor 17 as the copy destination. The copy registration process is thus performed.

If the user decides not to perform the copy process at this priority level, the user re-inputs a copy operation time of the copy process to the input unit in the management terminal 13.

The monitoring module 33 monitors a state of access by the host to the storage device. For example, the data transfer process monitoring module 33 monitors a data transfer amount of the host I/O response (hereinafter simply referred to as data transfer amount) in the second processor 17 on a per port basis (see reference characters "p-8" through "p-15" in FIG. 2). The data transfer process monitoring module 33 detects the data transfer amount in each of the second processors 17-1 through 17-m on a per port basis.

The copy process may be performed from the copy source physical disk 12-1 to the copy destination physical disk 12-2 with reference to FIGS. 2 and 3. From the end of the copy registration process to the end of the copy process, the data transfer process monitoring module 33 detects the data transfer amount in each of the copy source second processor 17-1 and the copy destination second processor 17-2 with a predetermined period shorter than the interval Ti.

The re-scheduler 34 performs a re-schedule process, re-scheduling the schedule information stored on the schedule information storage unit 19 in accordance with the data transfer amount monitored by the data transfer process monitoring module 33. For example, the re-scheduler 34 acquires the data transfer amount of each of the copy source second processor 17 and the copy destination second processor 17, and then determines whether the acquired data transfer amount is less than a predetermined value.

If the data transfer process monitoring module 33 determines that the acquired data transfer amount is less than the predetermined value, the re-scheduler 34 performs the re-schedule process so that any of a plurality of unit copy operations is performed ahead of schedule. For example, if the data transfer process monitoring module 33 determines that the data transfer amount of one of the copy source second processor 17 and the copy destination second processor 17 is less than the predetermined value, the re-scheduler 34 performs the re-schedule process so that a unit copy operation to be performed next by the second processor 17 is performed at the present time ahead of schedule.

Figure 8:
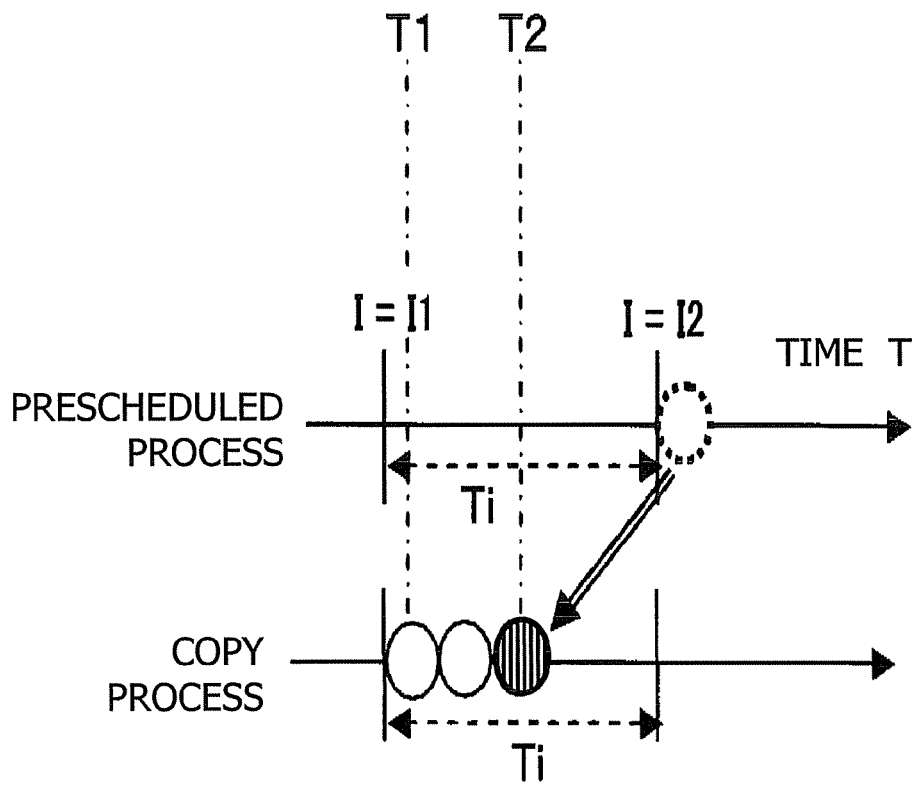
FIG. 8 illustrates another example of the re-schedule process performed by the re-schedule processor in the virtual storage system in accordance with the first embodiment of the present invention.
Figure 9:
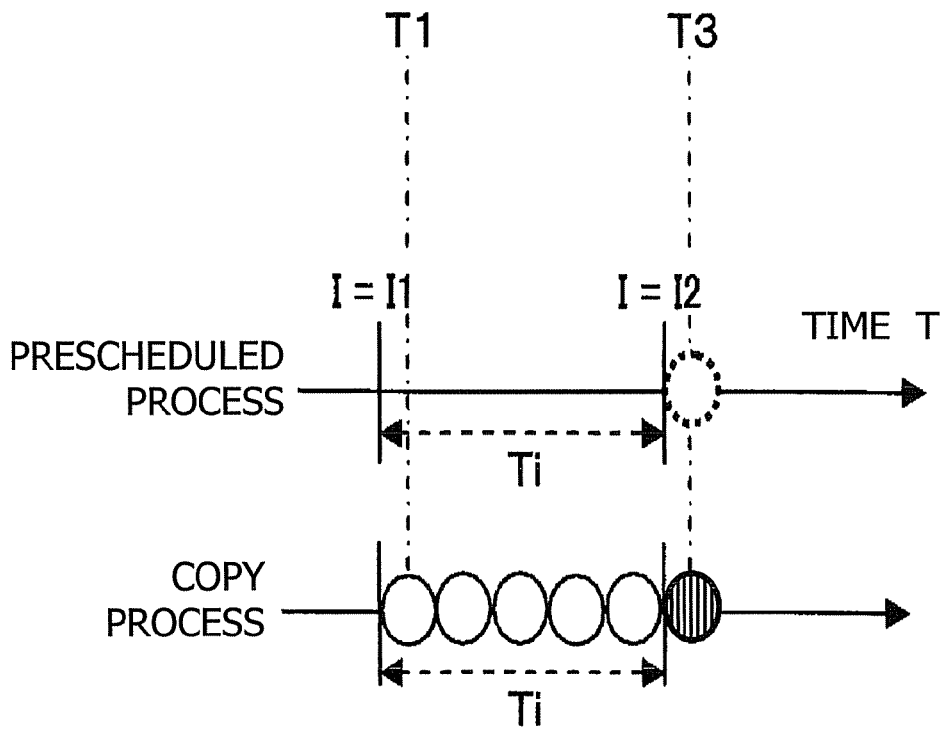
FIG. 9 illustrates another example of the re-schedule process performed by the re-schedule processor in the virtual storage system in accordance with the first embodiment of the present invention.

FIGS. 7-9 illustrate one example of the re-schedule process performed by the re-scheduler 34 in the virtual storage system 10 in accordance with the first embodiment of the present invention.

Referring to FIG. 7, if the re-scheduler 34 determines at time T1 that the data transfer amount of the second processor 17 is less than the predetermined value, the re-scheduler 34 performs the re-schedule process so that the unit copy operation to be executed by the second processor 17 as a determination target at a timing I2 is performed at time T1 ahead of schedule.

The re-scheduler 34 performs carrying out copying the at least a part of the data stored in the first area into the second area progressively while the monitored state of the access by the host allows copying of the data from the first area into the second area;

Referring to FIG. 8, if the re-scheduler 34 determines within a duration of time from time T1 to time T2 that the data transfer amount of the second processor 17 as the determination target is equal to or above the predetermined value, the re-scheduler 34 places at a higher priority the host I/O response of the second processor 17 as the determination target. If the re-scheduler 34 determines at time T2 that the data transfer amount of the second processor 17 is less than the predetermined value (with the host I/O response completed), the re-scheduler 34 performs the re-schedule process so that the unit copy operation to be performed at a next timing I2 by the second processor 17 as the determination target is to be performed at time T2 ahead of schedule.

In accordance with the first embodiment, the re-scheduler 34 allows the unit copy operation to be performed ahead of schedule by a duration of time not longer than the interval Ti.

With reference to FIGS. 7 and 8, the re-scheduler 34 allows a next unit copy operation to be performed ahead of schedule not before the timing I1 preceding the timing I2 prescheduled.

As illustrated in FIG. 9, a series of host I/O responses may remain to be processed from timing I1 at which a preceding unit copy operation is prescheduled (see time "T1" in FIG. 9) to timing I2 at which a next unit copy operation is prescheduled (see time "T3" in FIG. 9), and it may be repeatedly determined that the data transfer amount of the second processor 17 is equal to or above the predetermined value. In such a case, the re-scheduler 34 executes the next unit copy operation at time I2 as prescheduled without delaying.

The re-scheduler 34 performs enhancing copying, if any portion of the at least a part of the data remains when a time limit set by the schedule is expired, the remaining portion of the at least a part of the data from the first area into the second area. Even if the data transfer amount monitored by the data transfer process monitoring module 33 is equal to or above the predetermined value, the re-scheduler 34 performs the re-schedule process so that each unit copy operation is completed before the timing of the schedule information prescheduled (generated prior to the re-schedule process).

Figure 10:
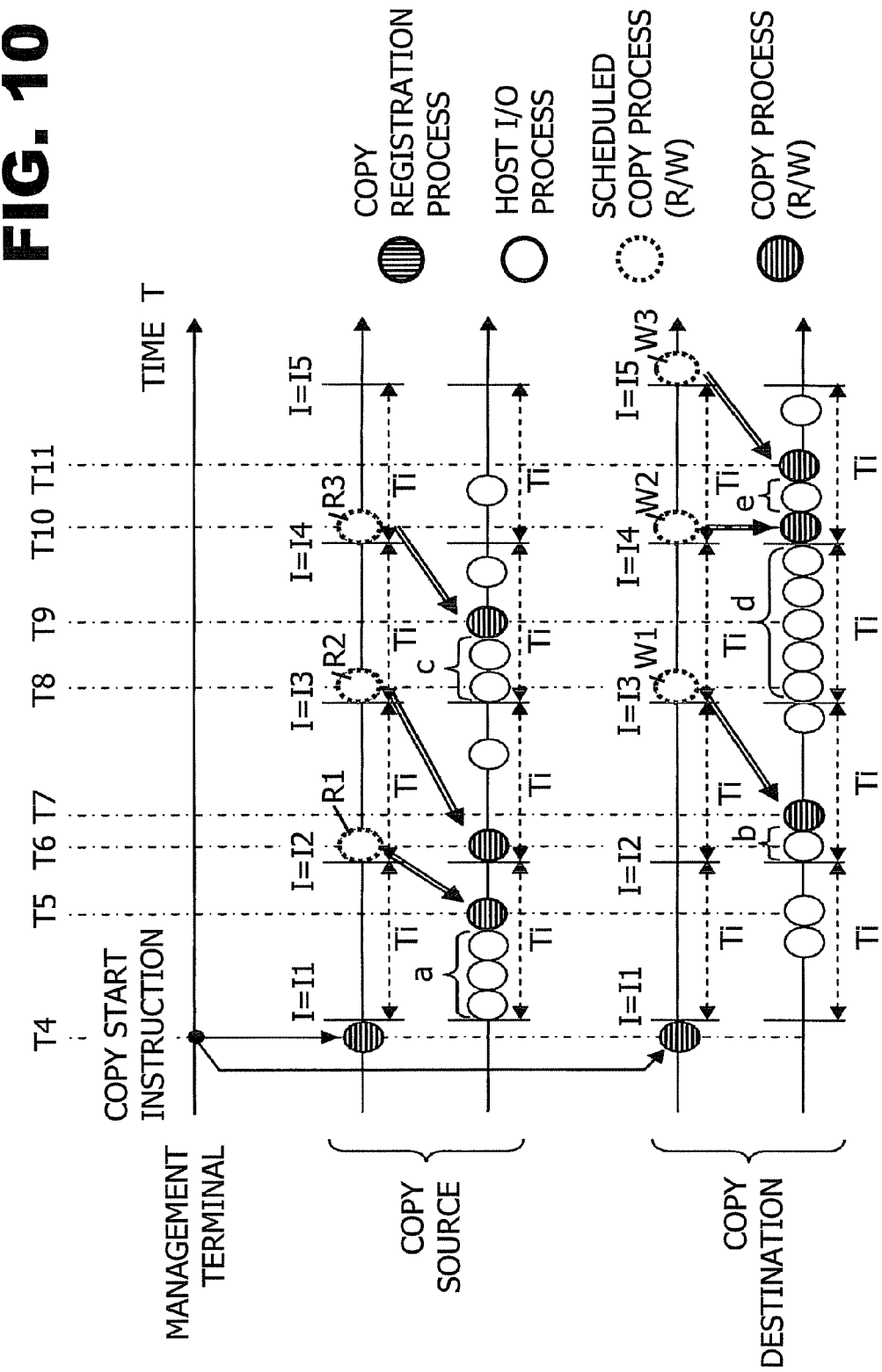
FIG. 10 illustrates a specific example of the re-schedule process performed by the re-schedule processor in the virtual storage system in accordance with the first embodiment of the present invention.

FIG. 10 illustrates a specific example of the re-schedule process performed by the re-scheduler 34 in the virtual storage system 10 in accordance with the first embodiment of the present invention.

The re-schedule process of the re-scheduler 34 in the copy process performed from the copy source physical disk 12-1 to the copy destination physical disk 12-2 as illustrated in FIGS. 2 and 3 is described below with reference to FIG. 10.

Referring to FIG. 10, the schedule information generator 30 performs the copy registration process at time T4 (see time "T4" in FIG. 10). The re-scheduler 34 processes the host I/O response of the copy source second processor 17-1 with a higher priority as long as the re-scheduler 34 determines that the data transfer amount of the copy source second processor 17-1 is equal to or above the predetermined value (see reference character "a" and times "T4" and "T5" in FIG. 10).

If the re-scheduler 34 determines at time T5 that the data transfer amount of the copy source second processor 17-1 is less than the predetermined value, the re-scheduler 34 performs the re-schedule process so that a first unit read cycle R1 to be executed at a next timing I2 is performed at time T5 ahead of schedule.

At a time prior to time T6, namely, at a time prior to the prescheduled timing I3 by a period longer than the interval Ti, the re-scheduler 34 does not perform the re-schedule process. In other words, a first unit write operation W1 to be executed at next timing I3 is not performed prior to time T6 ahead of schedule even if the re-scheduler 34 determines that the data transfer amount of the copy destination second processor 17-2 is less than the predetermined value.

If the re-scheduler 34 determines at time T6 at the next prescheduled timing I2 that the data transfer amount of the copy source second processor 17-1 is less than the predetermined value, the re-scheduler 34 performs the re-schedule process so that a second unit read operation R2 to be executed at next timing I3 is performed at time T6 ahead of schedule.

At a time prior to time T8, namely, at a time prior to the prescheduled timing I4 by a period longer than the interval Ti, the re-scheduler 34 does not perform the re-schedule process. In other words, a third unit read operation R3 is not performed prior to time T8 ahead of schedule even if the re-scheduler 34 determines that the data transfer amount of the copy source second processor 17-1 is less than the predetermined value.

The re-scheduler 34 processes the host I/O response of the copy destination second processor 17-2 as long as the re-scheduler 34 determines at time T6 and thereafter that the data transfer amount of the copy destination second processor 17-2 is equal to or above the predetermined value (see reference character "b" in FIG. 10). If the re-scheduler 34 determines at time T7 that the data transfer amount of the copy destination second processor 17-2 is less the predetermined value, the re-scheduler 34 performs the re-schedule process so that a first write operation W1 to be executed at the next timing I3 is performed at time T7 ahead of schedule.

As long as the re-scheduler 34 determines at time T8 at the next prescheduled timing I3 and thereafter that the data transfer amount of the copy destination second processor 17-2 is equal to or above the predetermined value, the re-scheduler 34 processes the host I/O response of the copy source second processor 17-1 with a higher priority (see reference character "c" in FIG. 10). If the re-scheduler 34 determines at time T9 that the data transfer amount of the copy source second processor 17-1 is less than the predetermined value, the re-scheduler 34 performs the re-schedule process so that a third read operation R3 to be executed at next timing I4 is performed at time T9 ahead of schedule.

Since the re-scheduler 34 repeatedly determines time T8 through time T10 that the data transfer amount of the copy destination second processor 17-2 is equal to or above the predetermined value (see reference character "d" in FIG. 10), the re-scheduler 34 does not perform the re-schedule process that allows a second write operation W2 to be executed at the next timing I4 to be performed ahead of schedule. The copy destination second processor 17-2 executes the second unit write operation W2 as prescheduled (see time "T10" in FIG. 10).

As long as the re-scheduler 34 determines at time T10 and thereafter that the data transfer amount of the copy destination second processor 17-2 is equal to or above the predetermined value, the re-scheduler 34 processes the host I/O response of the copy destination second processor 17-2 (see reference character "e" in FIG. 10) with a priority. If the re-scheduler 34 determines at time T11 that the data transfer amount of the copy destination second processor 17-2 is less than the predetermined value, the re-scheduler 34 performs the re-schedule process so that a third unit write operation W3 to be executed at a next timing is executed at time T11 ahead of schedule.

In this way, the re-scheduler 34 performs the re-schedule process on the schedule information stored on the schedule information storage unit 19 in response to the data transfer amount monitored by the data transfer process monitoring module 33.

FIG. 11 illustrates one example of the copy process list 900 performed by the virtual storage system 10 in accordance with the first embodiment of the present invention.

The copy process performed by the virtual storage system 10 in accordance with the first embodiment of the present invention is described below with reference to FIG. 11 (numbers (1) through (10)).

The user inputs a copy request for a virtual disk while watching the GUI screen (refer to number (1)). The user then enters the copy source specifying information, the copy destination specifying information, and the copy operation time to the input unit in the management terminal 13 (an input step represented by number (2)).

The management terminal 13 transmits these pieces of input information to the virtual switch 14 (schedule information generator 30), and the virtual switch 14 acquires the transmitted information (refer to number (3)).

The schedule information generator 30 acquires a copy amount per copy operation (refer to number (4)), acquires the entire copy amount (refer to number (5)), and calculates the Ti based on the copy operation time T, the entire copy amount Y and the copy amount Z for one copy operation (refer to number (6)).

The priority determiner 31 automatically determines the priority level based on the interval Ti calculated by the schedule information generator 30. The notifier 32 displays a message responsive to the priority level determined by the priority determiner 31 on the display (GUI screen) of the management terminal 13. The user is thus notified of the priority level at which the copy process is to be performed in response to the input information on the input unit in the management terminal 13 (refer to a notification step represented by number (7)).

The user recognizes the priority level displayed on the GUI screen. Upon deciding to perform the copy process at that priority level, the user inputs the copy start instruction to the input unit in the management terminal 13 (refer to number (8)).

In response to the copy start instruction, the management terminal 13 transmits the input instruction to each of the schedule information generator 30, the copy source second processor 17 and the copy destination second processor 17.

The schedule information generator 30 performs the copy registration process (schedule information generation step). The copy source second processor 17 and the copy destination second processor 17 perform the copy process in accordance with the schedule information stored on the schedule information storage unit 19 (refer to number (9)). The re-scheduler 34 performs the re-schedule process on the schedule information stored on the schedule information storage unit 19. The re-scheduler 34 then completes the copy process at a scheduled time specified by the user (refer to number (10)). The copy process thus ends.

Figure 12:
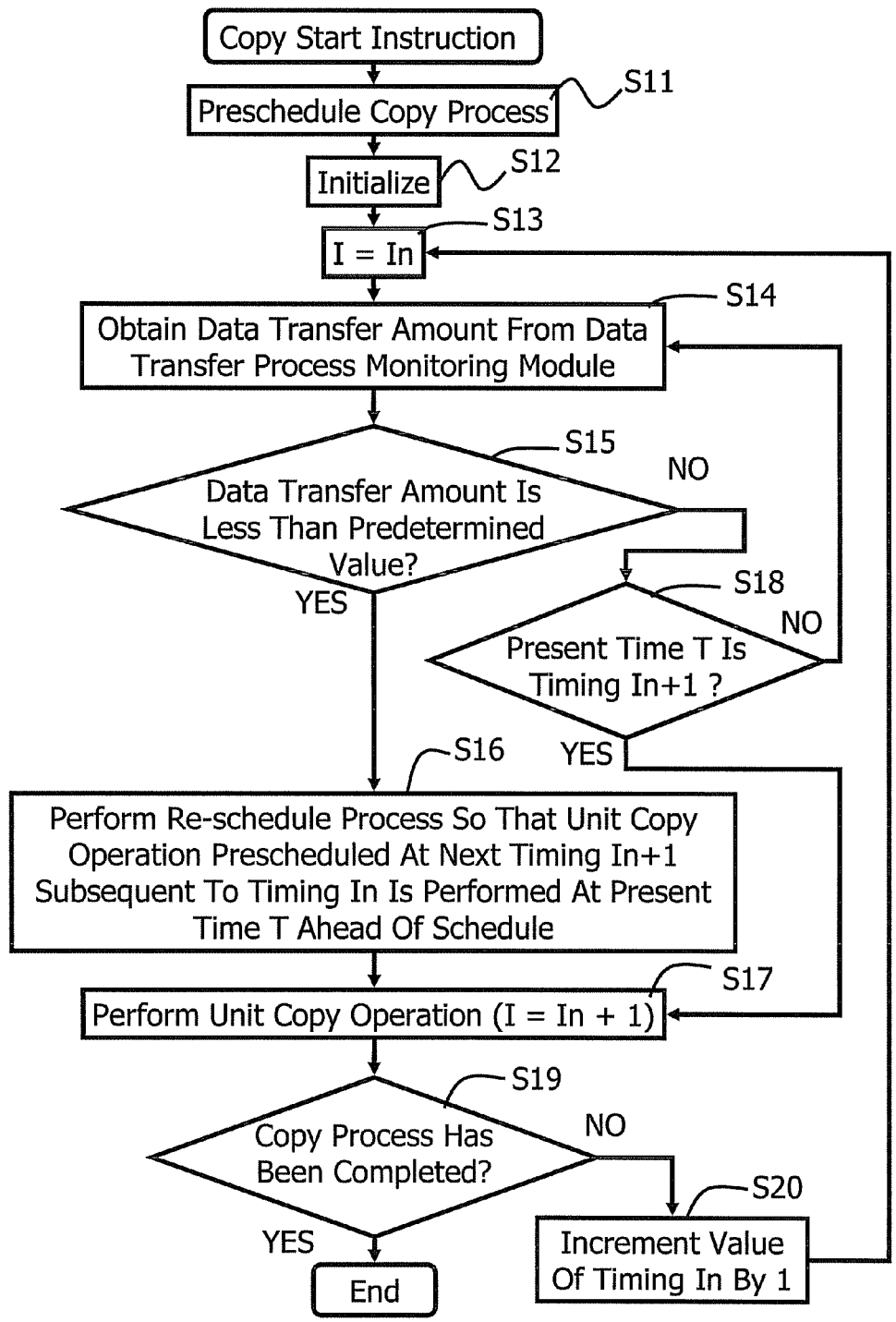
FIG. 12 illustrates a structure of a known virtual storage system.

The re-schedule process of the re-scheduler 34 in the virtual storage system 10 thus constructed in accordance with the first embodiment of the present invention is described below with reference to a flowchart (steps S11-S20) of FIG. 12.

Upon receiving the copy source specifying information, the copy destination specifying information, and the copy operation time information, the schedule information generator 30 performs the copy registration process (step S11). The re-scheduler 34 initializes the value of In (to In=I1) in step S12 where n is a variable.

At timing In (I=In) in step S13, the data transfer process monitoring module 33 monitors the data transfer amount of the second processor 17 (data transfer amount monitoring step). The re-scheduler 34 acquires the data transfer amount of the second processor 17-1 monitored by the data transfer process monitoring module 33 (step S14).

The re-scheduler 34 determines whether the data transfer amount of the second processor 17 is less than the predetermined value (step S15). If the re-scheduler 34 determines in step S15 that the data transfer amount of the second processor 17-1 is less than the predetermined value ("YES" in step S15), the re-scheduler 34 performs the re-schedule process so that a unit copy operation prescheduled at a next timing In+1 subsequent to the timing In is performed at the present time t ahead of schedule (step S16 as a re-schedule process step). The second processor 17 performs the unit copy operation, prescheduled at the next timing In+1, at present time t ahead of schedule in accordance with the schedule information stored on the schedule information storage unit 19 (step S17).

If the re-scheduler 34 determines in step S15 that the data transfer amount of the second processor 17 is equal to or above the predetermined value ("NO" in step S15), the re-scheduler 34 determines whether the present time t is the timing In+1 (step S18).

If the re-scheduler 34 determines in step S18 that the present time t is the timing In+1 ("YES" in step S18), processing proceeds to step S17. In accordance with the schedule information stored on the schedule information storage unit 19, the second processor 17 performs the unit copy operation at the next timing In+1 at the present time t as prescheduled. If the present time t is not yet the next timing In+1 ("NO" in step S18), processing proceeds to step S14.

When the second processor 17 performs the unit copy operation at the next timing In+1, the re-scheduler 34 determines whether all the copy process has been completed (step S19). If the re-scheduler 34 determines in step S19 that a part of the copy process has not yet been completed ("NO" in step S19), the re-scheduler 34 increments the value of the timing In by 1 (step S20), and returns to step S13.

If the re-scheduler 34 determines that all the copy process has been completed ("YES" in step S19), processing ends.

In accordance with the virtual storage system 10 of the first embodiment of the present invention, the data transfer amount exchanged between the second processor 17 and the host apparatus 11 is monitored on a per port basis, and the schedule information is generated so that the copy process is prescheduled to be performed in a plurality of unit copy operations from the copy source physical disk 12-1 to the copy destination physical disk 12-2. The re-schedule process is performed on the schedule information in accordance with the data transfer amount between the second processor 17 and the host apparatus 11. The copy process is not always performed in accordance with the prescheduled timing, but performed in accordance with the rescheduled timing taking into consideration the host I/O response. The drop in the host I/O response due the effect of the copy process is thus reduced.

If the data transfer amount of the second processor 17 is less than the predetermined value, the re-schedule process is performed so that the second processor 17 as the determination target performs the unit copy operation to be performed next is performed at the present time ahead of schedule. Without waiting for the prescheduled timing, the second processor 17 performs the unit copy operation when the data transfer amount is small between the second processor 17 and the host apparatus 11. The drop in the host I/O response due the effect of the copy process at the prescheduled timing is thus reduced.

Even if the data transfer amount of the second processor 17 is equal to or above the predetermined value, each unit copy operation is performed in accordance with the prescheduled timing indicated by the schedule information without any delay. The copy process is completed at the time specified by the user.

The schedule information generator 30 generates the schedule information based on the copy operation time, the data size of the data on the physical disk 12 at the copy source, and the size of the unit data processed at a unit copy operation. In accordance with the schedule information, the second processor 17 performs the unit copy operations for uniform unit sizes at the predetermined intervals Ti. The load of the copy process is uniformly split.

The user is notified of the priority level determined by the priority determiner 31. The priority level is thus clearly presented to the user.

After the copy source second processor 17 copies the data on the copy source physical disk 12 to the copy data buffer 20, the copy destination second processor 17 writes the data stored on the copy data buffer 20 onto the copy destination physical disk 12. The copy process is performed using the functions of the virtual switch 14. The copy process is thus performed independent of the storage units and the types of the storage units.

Figure 13:
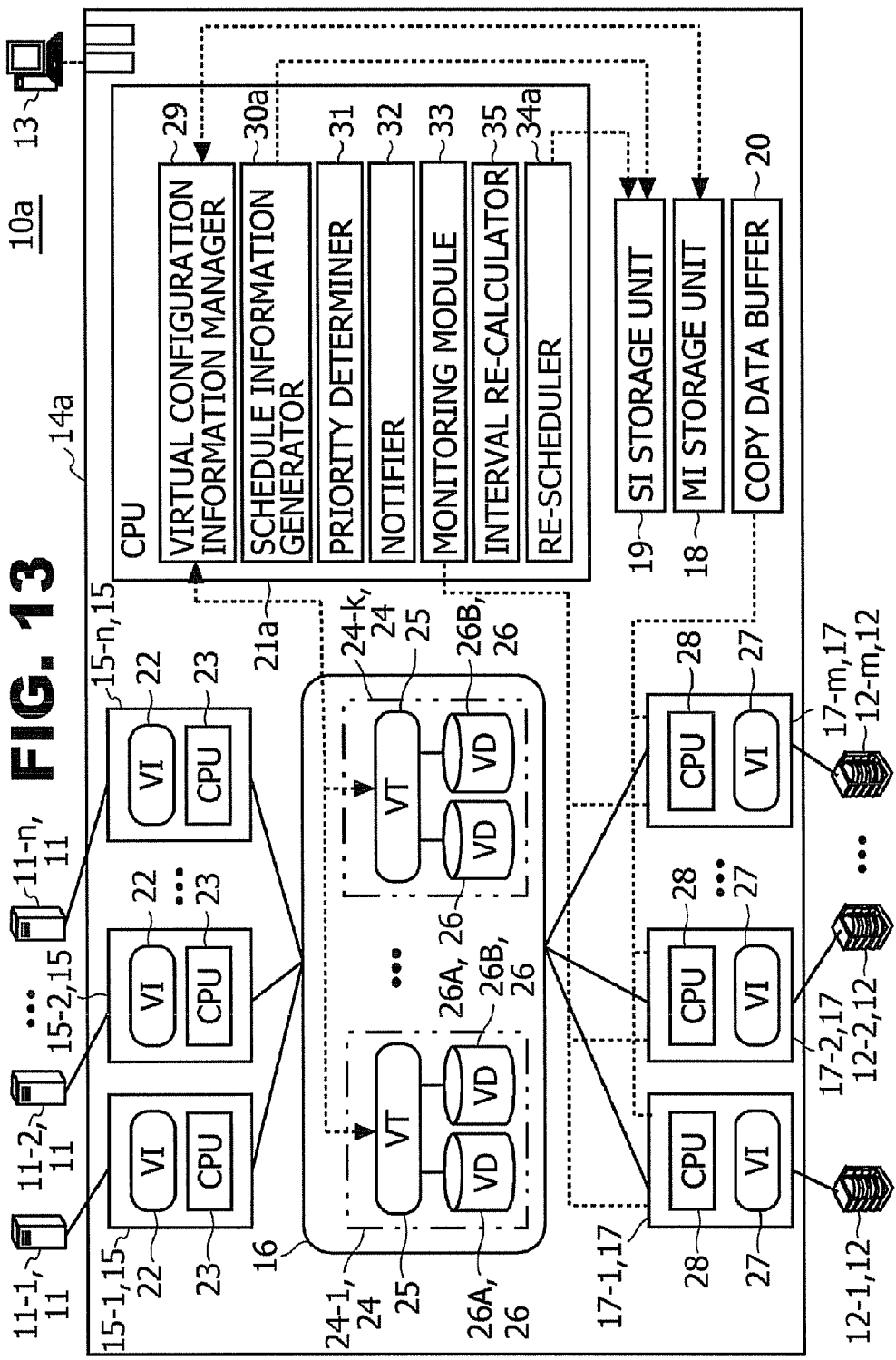
FIG. 13 diagrammatically illustrates a configuration of a virtual storage system as one example of a second embodiment of the present invention.

FIG. 13 diagrammatically illustrates a configuration of a virtual storage system as one example of a second embodiment.

The virtual storage system 10a as the one example of the second embodiment of the present invention is constructed by employing a virtual switch 14a instead of the virtual switch 14 of the virtual storage system 10 of the first embodiment of the present invention.

More specifically, as illustrated in FIG. 13, the virtual storage system 10a of the second embodiment includes at least one host apparatus (high level apparatus) 11-1 through 11-n (n being a natural number), a plurality of physical disks (first and second storage areas) 12-1 through 12-m (m being a natural number) (redundant arrays of inexpensive disk (RAID)) devices and display device), a management terminal 13, and the virtual switch (information processing apparatus) 14a.

As the virtual storage system 10 of the first embodiment, the virtual storage system 10a includes the virtual switch 14a is arranged between the plurality of host apparatuses 11-1 through 11-n and the plurality of physical disks 12-1 through 12-m.

The virtual switch 14a is connected to each of the plurality of host apparatuses 11-1 through 11-n and the plurality of physical disks 12-1 through 12-m via a communication line (data transfer system) such as FC. The virtual switch 14a is also connected to the management terminal 13 via a communication line such as a LAN.

In the virtual storage system 10a of the second embodiment of the present invention, the virtual switch 14a virtualizes and generally manages the physical disks 12-1 through 12-m. The virtual switch 14a then assigns a virtual volume to each of the host apparatuses 11-1 through 11-n.

As the virtual switch 14 in the virtual storage system 10 of the first embodiment, the virtual switch 14a virtualizes the physical disk 12 at a network layer (switch layer), and supplies the user with a virtual disk 26 to be discussed later which is independent of the host apparatus 11 and the physical disk 12. Referring to FIG. 13, the virtual switch 14a constructed as a computer includes at least one first processor (first port) 15-1 through 15-n , a virtual storage 16, a plurality of second processors (copy process executing unit or second port) 17-1 through 17-m, a mapping information storage unit 18, a schedule information storage unit 19, a copy data buffer 20, and a CPU 21a.

As shown, like reference numerals identical to those previously described are applied to like portions or substantially like portions, and the discussion thereof is omitted for convenience.

The CPU 21a in the virtual switch 14a performs a variety of numerical calculations, information processing, apparatus control, etc. The CPU 21a thus functions as a virtual configuration information manager 29, a schedule information generator 30a, a priority determiner 31, a notifier 32, a data transfer processing monitoring module (data transfer monitoring module) 33, a re-scheduler 34a, and an interval re-calculator 35.

As the schedule information generator 30 in the virtual storage system 10 of the first embodiment, the schedule information generator 30a generates beforehand the schedule information so that the copy process is split uniformly among a plurality of unit copy operations and is then executed (this process is also referred to as scheduling).

More specifically, when a copy start instruction is input to the input unit in the management terminal 13, the schedule information generator 30a generates the schedule information for the copy source second processor 17 to execute the copy process. The copy source second processor 17 thus performs the unit copy operations at the intervals Ti, thereby copying data of a constant data size (unit data size) at each unit copy operation. The schedule information thus generated is then stored on the schedule information storage unit 19.

When information needed for executing the above-described copy process is input to the input unit in the management terminal 13, the schedule information generator 30a calculates intervals Ti in accordance with the following equation (2) based on the copy operation time X, a size of data in the physical disk 12 as a copy source at that moment (remaining copy amount Ya), and a size of unit data for a single unit copy operation (copy amount for one copy cycle Z fixed to each apparatus):

$$Ti = X \times Z / Ya \quad (2)$$

For example, if the copy operation time X, the remaining copy amount Ya, and the copy amount per copy cycle Z are respectively X=300 (minutes), Ya=40960 (Mbytes), and Z=16 (Mbytes), then, the interval Ti of 7.03 (seconds) results.

The schedule information generator 30a thus functions as the interval calculator (not shown) for calculating the interval Ti based on the copy operation time X, the remaining copy amount Ya and the copy amount per copy cycle Z.

Also, the remaining copy amount Ya is determined by counting the number of copyings Cn executed and then by subtracting from the overall copy amount Y the product of the executed copy count Cn and the copy amount Z in accordance with the following equation (3).

$$Ya = Y - Cn \times Z \quad (3)$$

It is noted that the remaining copy amount Ya equals the above-described overall copy amount Y at the copy start, and gradually decreases as the unit copy operations are in progress.

In accordance with the second embodiment of the present invention, the CPU 21a functions as a remaining copy amount management unit that calculates and manages the remaining copy amount Ya in accordance with the above-described technique.

The second processor 17 generates the schedule information for executing the unit copy operation so that the plurality of unit copy operations are successively performed at the interval Ti calculated as described above. The generated schedule information is then stored on the schedule information storage unit 19.

In the virtual storage system 10a of the second embodiment, the schedule information is constructed by mapping planned execution time, data size, status, ahead-of-schedule information, etc. of the unit copy operation to, for example, the LBA indicating a storage location of data related to the unit copy operation.

It is noted that the ahead-of-schedule information is identification information representing whether the unit copy operation is the one that is set to be ahead of schedule by the re-scheduler 34a.

The generation of the schedule information and the copy registration process performed by the schedule information generator 30a are identical to those of the schedule information generator 30 in the virtual storage system 10 and the detailed discussion thereof is omitted herein.

The schedule information generated by the schedule information generator 30a and stored on the schedule information storage unit 19 is designed to be updated (re-scheduled) by the re-scheduler 34a in the same manner as in the virtual storage system 10 of the first embodiment of the present invention.

The re-scheduler 34a performs a re-schedule process for updating the schedule information stored on the schedule information storage unit 19 in accordance with the data transfer amount monitored by the data transfer monitoring module 33. For example, the re-scheduler 34a acquires the data transfer amounts of the second processor 17 as a copy source and the second processor 17 as a copy destination, detected by the data transfer monitoring module 33, and then determines whether the acquired data transfer amounts are less than any predetermined value.

If the re-scheduler 34a determines that the data transfer amount monitored by the data transfer monitoring module 33 is less than the predetermined value, the re-schedule process is thus set to be performed so that any one of the plurality of unit copy operations is set to be ahead of schedule. For example, if the re-scheduler 34a determines that the data transfer amount of one of the second processor 17 as a copy source and the second processor 17 as a copy destination is less than the predetermined amount, the re-scheduler 34a performs the re-schedule process so that a unit copy operation to be performed by the second processor 17 as a determination target is advanced to present time ahead of schedule.

If the re-schedule process for setting the unit copy operation to be ahead of schedule is performed in accordance with the second embodiment of the present invention and the second processor 17 is free from any process related to the host I/O response, the re-scheduler 34a performs the re-schedule process by setting the unit copy operation ahead of schedule with the length of the interval Ti varied.

More specifically, if the data transfer amount of one of the second processor 17 as a copy source and the second processor 17 as a copy destination is less than the predetermined amount, the re-scheduler 34a performs the re-schedule process so that the unit copy operations are performed ahead of schedule as much as possible.

The re-scheduler 34a sets to the unit copy operation performed ahead of schedule in the re-schedule process the identification information (ahead-of-schedule information) such as a flag or the like indicating that the unit copy operation has been performed ahead of schedule.

Furthermore in the re-schedule process, the re-scheduler 34a generates re-scheduling using the interval calculated by the interval re-calculator 35 to be discussed later.

The re-schedule process of the re-scheduler 34a of the second embodiment of the present invention for performing the unit copy operation ahead of schedule is identical to the process of the re-scheduler 34 of the first embodiment of the present invention except that the unit copy operation is performed ahead of schedule with the length of the interval Ti exceeded, and the detailed discussion of the re-schedule process is thus omitted herein.

A series of host I/O responses may remain to be processed (without being processed) from timing I1 at which a preceding unit copy operation is prescheduled (see time "T1" in FIG. 9) to timing I2 at which a next unit copy operation is prescheduled (see time "T3" in FIG. 9), and it may be repeatedly determined that the data transfer amount of the second processor 17 is equal to or above the predetermined value. In such a case, the re-scheduler 34a reliably executes the next unit copy operation at time I2 as prescheduled without being delayed, in the same manner as the re-scheduler 34 of the first embodiment.

The second processor 17 as a copy source performs a read process by reading data from the copy source physical disk 12 as a copy source via a port through a plurality of cycles in accordance with the schedule information stored on the schedule information storage unit 19 and then storing temporarily the read data onto the copy data buffer 20. Then, the second processor 17 as a copy destination performs a write process by reading data stored on the copy data buffer 20 through a plurality of cycles in accordance with the schedule information stored on the schedule information storage unit 19 and writing the read data onto the physical disk 12 as a copy destination via a port.

When performing the read process and the write process respectively, the second processor 17 as a copy source and the second processor 17 as a copy destination transmit respectively a completion report to the CPU 21a. In response to the completion report, the CPU 21a updates the status of the schedule information stored on the schedule information storage unit 19.

Furthermore, the CPU 21a has the function of an ahead-of-schedule process counter that counts the number of completed unit copy operations having undergone the ahead-of-schedule process. More specifically, in response to the completion report from the second processor 17 and the ahead-of-schedule information of the schedule information stored on the schedule information storage unit 19, the CPU 21a calculates the number of unit copy operations performed ahead of schedule by the re-scheduler 34a and then stores the count as an ahead-of-schedule count on an unshown memory or the like.

The interval re-calculator 35 calculates (re-calculates) the interval which is to be used by the re-scheduler 34a when the re-scheduler 34a re-generates the schedule information.

The interval re-calculator 35 re-calculates the interval related to the schedule information if the re-scheduler 34a performs the unit copy operation ahead of schedule and a predetermined frequency condition is satisfied.

The predetermined frequency condition relates to the frequency of occurrences at which the interval is re-calculated. For example, the frequency condition is a predetermined number of times n (n is a natural number). In other words, the interval re-calculator 35 determines that the frequency condition is satisfied if the number of ahead-of-schedule operations is equal to or above the predetermined number of times n. The number of ahead-of-schedule operations is reset each time the interval re-calculator 35 re-calculates the interval.

It is noted that the predetermined number of times n is input beforehand to the input unit in the management terminal 13 by the user first and then stored on a storage device such as an unshown memory. A predetermined value as an initial setting value may be set for the frequency condition information on the virtual switch 14a when the virtual switch 14a is shipped from the plant thereof. The user may also modify the initial setting value to any value on the input unit of the management terminal 13.

Even if the unit copy operation set to be ahead of schedule by the re-scheduler 34a is performed and the predetermined frequency condition is satisfied, the interval re-calculator 35 calculates the interval Ti in accordance with the previously described calculation equation (equation 2).

For example, the predetermined number of time n=5 is now set as the frequency condition information. If the unit copy operation set to be ahead of schedule by the re-scheduler 34a is performed by five times, the interval re-calculator 35 re-calculates the interval Ti. Also, the predetermined number of time n=1 is now set as the frequency condition information. In this case, the interval re-calculator 35 re-calculates the interval Ti each time the unit copy operation set to be ahead of schedule by the re-scheduler 34a is performed.

With the predetermined number of times n being 2 or larger, the number of calculations of the interval Ti by the interval re-calculator 35 is reduced. In this way, the workload on the CPU 21a is reduced.

Figure 14:
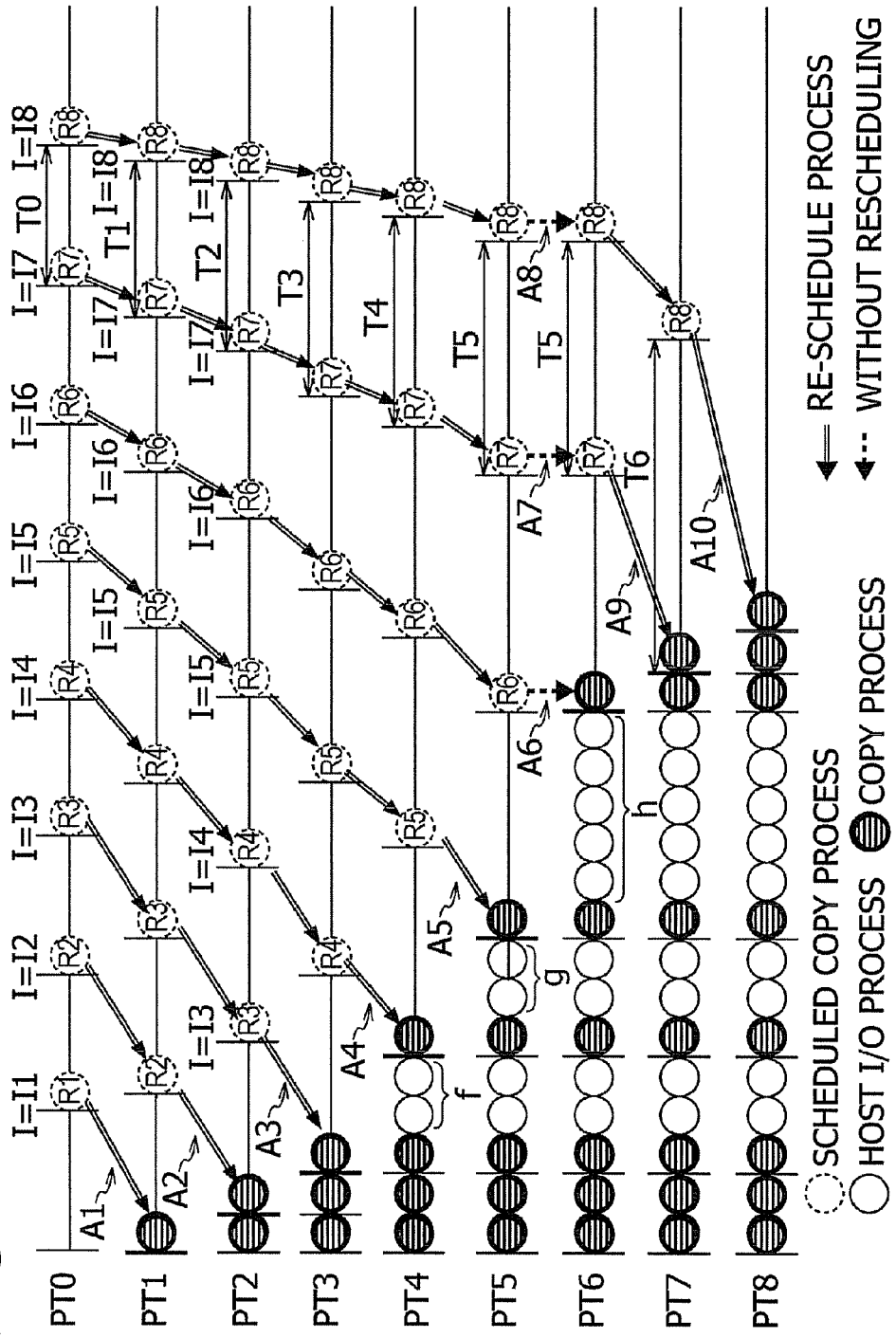
FIG. 14 specifically illustrates a process method of a unit copy operation of the virtual storage system as one example of the second embodiment the present invention.

FIG. 14 specifically illustrates a processing method of the unit copy operation of the virtual storage system 10a as one example of the second embodiment of the present invention.

A specific example of the re-schedule process of the re-scheduler 34a and the interval re-calculator 35 is described with reference to FIG. 14, wherein the copy process is performed from the physical disk 12 as a copy source (for example, 12-1) to the physical disk 12 as a copy destination (for example, 12-2).

FIG. 14 illustrates the copy process of the virtual storage system 10a in a plurality of steps (steps PT0-PT8). In the example of FIG. 14, the read process only is described as the copy process for convenience of explanation, and there are cases when the read process is described as the unit copy operation.

Referring to FIG. 14, a unit copy operation scheduled is denoted by a broken-outlined blank circle, a unit copy operation processed by the second processor 17 is denoted as a real copy operation by a solid circle, and a host I/O response processed by the second processor 17 is denoted by a solid-outlined blank circle.

Furthermore in FIG. 14, a re-scheduling ahead of schedule is denoted by arrow-headed dual lines, and a state with no scheduling updated is denoted by an arrow-headed broken line.

Referring to FIG. 14, the predetermined number of times n=1 is set as the frequency condition information.

In step PT0, the user issues a copy instruction of a virtual disk on the management terminal 13 while referring to the GUI screen or the like. In the copy instruction, the user enters the copy source specifying information, the copy destination specifying information, and the copy operation time to the input unit in the management terminal 13.

The schedule information generator 30a performs the pre-scheduling (copy registration process) in accordance with the input information.

More specifically, the schedule information generator 30a calculates the interval (predetermined time period) Ti in accordance with the following equation (2) based on the copy operation time, a size of data to be copied (remaining copy amount Ya=overall copy amount Y), and the copy amount per copy cycle Z, and generates the schedule information for executing successively a plurality of unit copy operations at the intervals Ti.

In step PT0, as illustrated in FIG. 14, eight unit copy operations R1-R8 (timings 11-18) are pre-scheduled at intervals T0.

Referring to FIG. 14, time periods between timings 11-18 at each of the steps PT0-PT8, i.e., the intervals Ti are equal. For convenience of explanation, intervals T0-T6 are illustrated between timing 17 and timing 18.

If the data transfer amount of the second processor 17 is less than the predetermined value in step PT1, the re-scheduler 34a performs the re-schedule process so that the first unit copy operation R1 to be performed at timing 11 is performed ahead of schedule (see an arrow A1 in FIG. 14). The second processor 17 executes the first unit copy operation R1 in accordance with the re-scheduled schedule information.

The interval re-calculator 35 calculates the interval T1 in accordance with the previously described calculation equation (2) for the remaining unit copy operations R2-R8. Since time has elapsed between step PT0 and step PT1, the copy operation time X is decreased. But the unit copy operation R1 has been completed, the remaining copy amount Ya is also decreased. As a result, the interval T1 becomes longer than the interval T0. The re-scheduler 34a performs the re-schedule process for the remaining unit copy operations R2-R8 in accordance with the interval T1 calculated by the interval re-calculator 35.

Since the data transfer amount of the second processor 17 is less than the predetermined value in step PT2, the re-scheduler 34a performs the re-schedule process so that the unit copy operation R2 to be performed at timing 12 is performed ahead of schedule (see an arrow A2 in FIG. 14). The second processor 17 executes the unit copy operation R2 set to be ahead of schedule in accordance with the re-scheduled schedule information.

The interval re-calculator 35 calculates the interval T2 in accordance with the previously described calculation equation (2) for the remaining unit copy operations R3-R8. The re-scheduler 34a performs the re-schedule process for the remaining unit copy operations R3-R8 in accordance with the interval T2 calculated by the interval re-calculator 35.

Since the second processor 17 has no data transfer amount in step PT3, the re-scheduler 34a performs the re-schedule process so that the unit copy operation R3 to be performed at timing 13 is performed ahead of schedule (see an arrow A3 in FIG. 14). The second processor 17 executes the unit copy operation R3 set to be ahead of schedule in accordance with the re-scheduled schedule information.

The interval re-calculator 35 calculates the interval T3 in accordance with the previously described calculation equation (2) for the remaining unit copy operations R4-R8. The re-scheduler 34a performs the re-schedule process for the remaining unit copy operations R4-R8 in accordance with the interval T3 calculated by the interval re-calculator 35.

While it is determined that the data transfer amount of the second processor 17 is equal to or above the predetermined value in step PT4, the re-scheduler 34a processes the host I/O response of the second processor 17 with priority (see the letter "f" in FIG. 14). If it is then determined that the data transfer amount of the second processor 17 as a copy source is less than the predetermined value, the re-scheduler 34a performs the re-schedule process so that the unit copy operation R4 to be executed at timing 14 is performed ahead of schedule (see an arrow A4 in FIG. 14). The second processor 17 then executes the unit copy operation R4 set to be ahead of schedule in accordance with the re-scheduled schedule information.

The interval re-calculator 35 calculates the interval T4 in accordance with the previously described calculation equation (2) for the remaining unit copy operations R5-R8. The re-scheduler 34a performs the re-schedule process for the remaining unit copy operations R5-R8 in accordance with the interval T4 calculated by the interval re-calculator 35.

While it is determined that the data transfer amount of the second processor 17 is equal to or above the predetermined value in step PT5, the re-scheduler 34a processes the host I/O response of the second processor 17 with priority (see the letter "g" in FIG. 14). If it is then determined that the data transfer amount of the second processor 17 as a copy source is less than the predetermined value, the re-scheduler 34a performs the re-schedule process so that the unit copy operation R5 to be executed at timing 15 is performed ahead of schedule (see an arrow A5 in FIG. 14). The second processor 17 then executes the unit copy operation R5 set to be ahead of schedule in accordance with the rescheduled schedule information.

The interval re-calculator 35 calculates the interval T5 in accordance with the previously described calculation equation (2) for the remaining unit copy operations R6-R8. The re-scheduler 34a performs the re-schedule process for the remaining unit copy operations R6-R8 in accordance with the interval T5 calculated by the interval re-calculator 35.

While it is determined that the data transfer amount of the second processor 17 is equal to or above the predetermined value in step PT6, the re-scheduler 34a processes the host I/O response of the second processor 17 with priority (see the letter "h" in FIG. 14).

If the planned execution time of the unit copy operation R6 is reached in the re-schedule process in step PT5, the second processor 17 executes the unit copy operation R6 as scheduled (see an arrow A6 in FIG. 14).

More specifically, the second processor 17 in the virtual storage system 10a of the second embodiment performs reliably each unit copy operation as scheduled without being delayed from the timing scheduled in the updated schedule information.

Since the unit copy operation is not performed ahead of schedule in step PT6, the interval re-calculator 35 does not re-calculate the interval. The re-scheduler 34a does not perform the re-schedule process (see arrows A7 and A8 in FIG. 14).

If it is determined in step PT7 that the data transfer amount of the second processor 17 as a copy source is less than the predetermined value, the re-scheduler 34a performs the re-schedule process so that the unit copy operation R7 to be performed at timing 17 is performed ahead of schedule (see an arrow A9 in FIG. 14). The second processor 17 executes the unit copy operation R7 set to be ahead of schedule in the re-scheduled schedule information.

The interval re-calculator 35 re-calculates the interval T6 in accordance with the above-described calculation equation (equation 2) for the remaining unit copy operation R8. In response to the interval T6 calculated by the interval re-calculator 35, the re-scheduler 34a performs the re-schedule process for the remaining unit copy operation R8.

If it is determined in step PT8 that the data transfer amount of the second processor 17 is less than the predetermined value, the re-scheduler 34a performs the re-schedule process so that the unit copy operation R8 to be performed at timing 18 is performed ahead of schedule (see an arrow A10 in FIG. 14). The second processor 17 executes the unit copy operation R8 to be set ahead of schedule in re-scheduled schedule information.

In this way, the interval re-calculator 35 in the virtual storage system 10a re-calculates the interval and the re-scheduler 34a in the virtual storage system 10a performs the re-schedule process in accordance with the data transfer amount monitored by the data transfer monitoring module 33.

Figure 15:
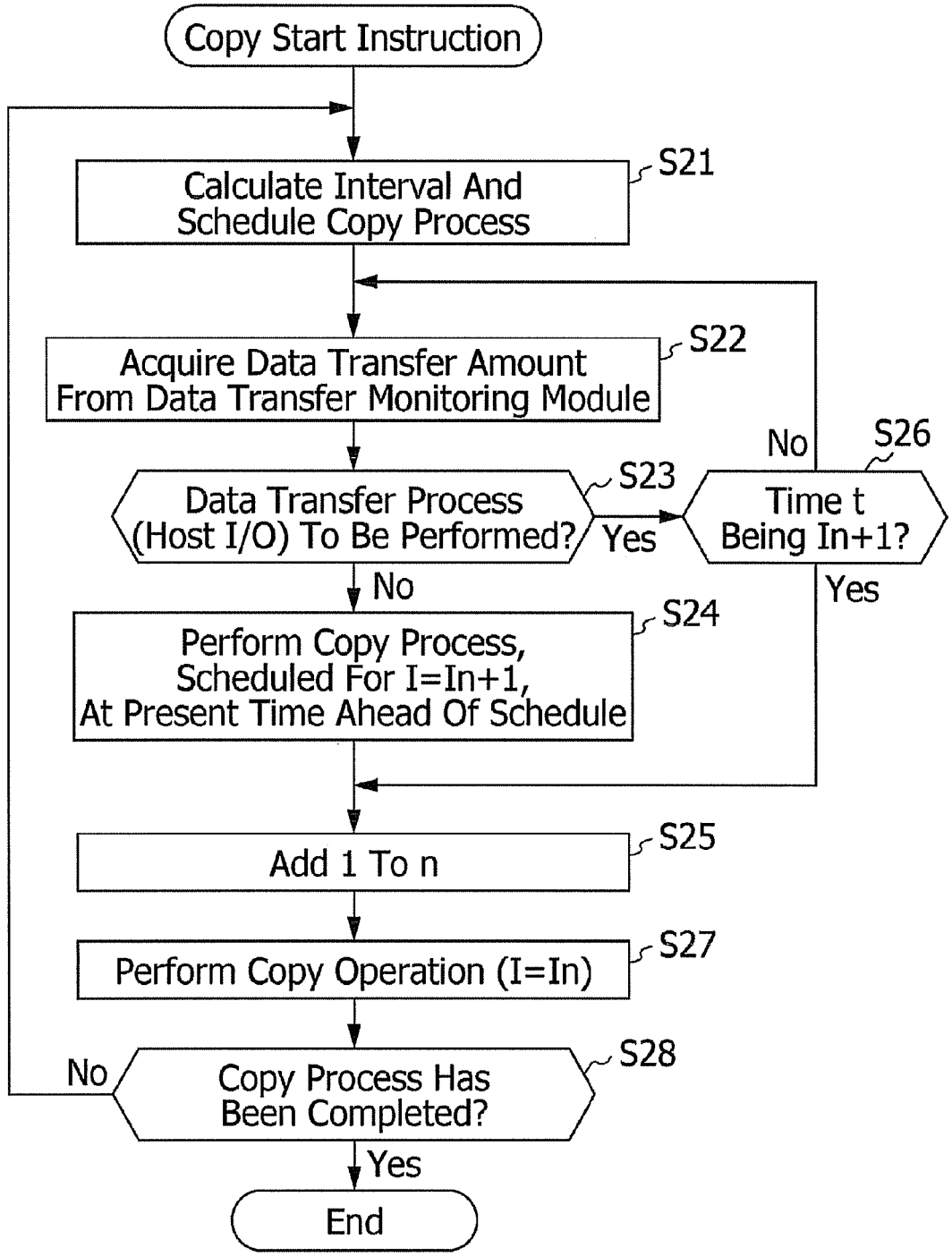
FIG. 15 is a flowchart illustrating a schedule management technique of a re-scheduler of the virtual storage system as one example of the second embodiment of the present invention.
Figure 16:
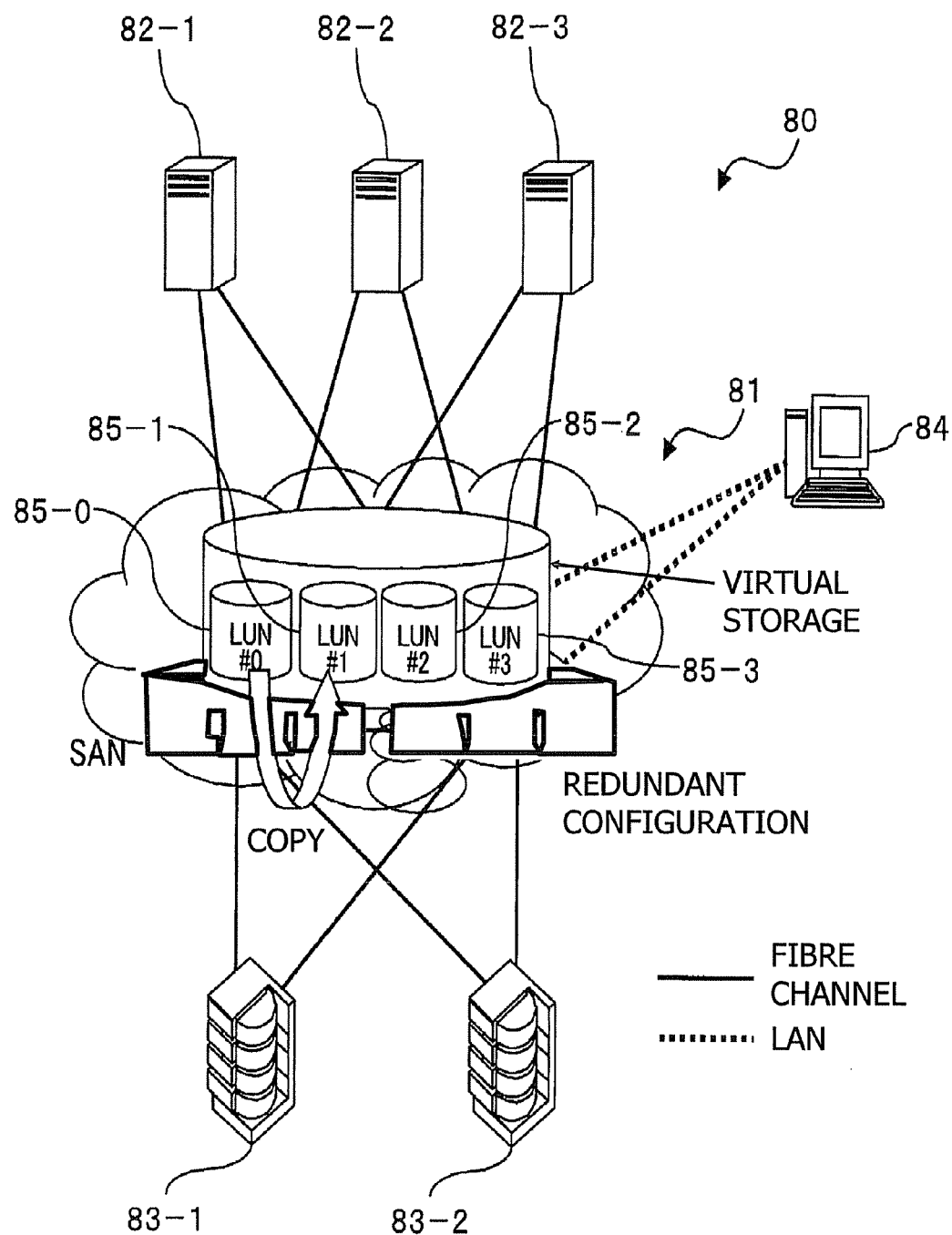
FIG. 16 illustrates a known virtual storage system.

A scheduling management process of the re-scheduler 34a in the virtual storage system 10a thus constructed as one example of the second embodiment is described below with reference to a flowchart (steps S21-S28) illustrated in FIG. 15. Referring to FIG. 15, the predetermined number of times n=1 is set for the frequency condition information.

When the user enters the copy source specifying information, the copy destination specifying information, and the copy operation time to the input unit in the management terminal 13, the schedule information generator 30a calculates the interval Ti based on the copy operation time X, the size of the data to be copied (remaining copy amount Ya) and the copy amount per copy cycle Z in accordance with the above-described calculation equation (equation 2) (an interval calculation step and a re-schedule process step). The schedule information generator 30a then generates the schedule information so that the second processor 17 executes the unit copy operation at constant intervals Ti (step S21).

The data transfer monitoring module 33 monitors the data transfer amount of the second processor 17 (data transfer amount monitoring step), and the re-scheduler 34a acquires the data transfer amount of the second processor 17 monitored by the data transfer monitoring module 33 (step S22).

The re-scheduler 34a determines whether the data transfer amount of the second processor 17 is less than the predetermined value (step S23). If it is determined that the data transfer amount of the second processor 17 is less than the predetermined value (see "NO" subroutine from step S23), the re-scheduler 34a performs the re-schedule process so that the unit copy operation prescheduled at timing In+1 subsequent to timing In is set to be ahead of schedule (step S24 as a re-scheduling process step).

The re-scheduler 34a adds one to (increments) the value of In (step S25). On the basis of the schedule information stored on the schedule information storage unit 19, the second processor 17 executes the unit copy operation, scheduled at the next timing In+1, at the present time t ahead of schedule (step S27).

The re-scheduler 34a then determines whether all the copy process has been completed (step S28). If it is determined that part of copy process has not been completed ("NO" subroutine from step S28), processing returns to step S21.

If the re-scheduler 34a determines that the copy process has been completed ("YES" subroutine from step S28), processing ends.

On the other hand, if the re-scheduler 34a determines that the data transfer amount of the second processor 17 is equal to or above the predetermined value ("YES" subroutine from step S23), the re-scheduler 34a determines whether the present time t has reached timing In+1 (step S26).

If the determination results show that the present time t has reached the timing In+1 ("YES" subroutine from step S26), processing proceeds to step S25. If the present time has yet to reach the timing In+1 ("NO" subroutine from step S26), processing returns to step S22.

If the transfer data amount monitored by the data transfer monitoring module 33 is less than the predetermined value, the re-scheduler 34a in the virtual storage system 10a as one example of the second embodiment of the present invention performs the re-schedule process in order to update the schedule information so that any of the plurality of unit copy operations is set to be ahead of schedule. In this way, the unit copy operation is executed without waiting for the time elapse to the scheduled time if the data transfer amount between the second processor 17 and the host 11 is small. The copy process is thus executed at a high speed.

The copy process is executed with a high priority when the operations related to the host I/O response are small. Even if the host I/O responses greatly increase in quantity later, the operations related to the host I/O responses are performed well in advance. In this way, both the host I/O response and the copy process are efficiently performed. The reduction of the host I/O response due to the copy process performed at the scheduled time can be decreased.

The data transfer amount between the second processor 17 and the host 11 is monitored, and the schedule information is set so that the copy process from a physical disk 12 as a copy source to a physical disk 12 as a copy destination is performed with the process evenly divided into a plurality of unit copy operations. The re-schedule process is thus performed in response to the data transfer amount between the second processor 17 and the host 11. The unit copy operations are not performed at pre-scheduled timings but re-scheduled in response to the host I/O response. This arrangement decreases the reduction of the host I/O response due to the effect of the copy process.

Even if the data transfer amount of the second processor 17 is equal to or above the predetermined value, each unit copy operation is executed as scheduled without being delayed from the timing of the schedule information. The copy process is thus completed in time for the time specified by the user.

If the second processor 17 performs the unit copy operation ahead of schedule in accordance with the schedule information re-scheduled by the re-scheduler 34a, and the predetermined frequency condition is satisfied, the interval of the schedule information is re-calculated. In this case, the interval re-calculator 35 re-calculates the interval based on the copy operation time, the data size of the remaining copy amount, and the data size of the unit data for a single unit copy operation per cycle.

As the unit copy operations are in progress, the data size of the remaining copy amount decreases, and the interval calculated later becomes longer. The host I/O response is processed with a higher priority with time. If the host I/O response heavily occurs later, the host I/O response may be processed with a higher priority.

It is difficult for the virtual switch 14a to predict when a large amount of host I/O response occurs. The re-scheduler 34a in the virtual storage system 10a thus performs the re-schedule process so that the unit copy operation is performed ahead of schedule whenever possible. The virtual storage system 10a performs the re-schedule process with the re-scheduler 34a thereof so that the unit copy operation is processed ahead of schedule whenever possible and re-calculates the interval with the interval re-calculator 35 thereof if the unit copy operation is processed ahead of schedule. Such an arrangement is useful for the host I/O response to be processed efficiently with a high priority.

The virtual storage system 10a of the second embodiment can complete the copy process in accordance with the time specified by the user, and the host I/O response can be efficiently processed with priority.

The present invention is not limited to the above-described embodiments, and a variety of changes are possible without departing from the scope of the present invention.

In accordance with the above-described embodiments, the mapping information storage unit 18, the schedule information storage unit 19, and the CPUs 21 and 21a are arranged within the virtual switches 14 and 14a. The present invention is not limited to the above-described embodiments. The mapping information storage unit 18, the schedule information storage unit 19, and the CPUs 21 and 21a may be arranged in the management terminal 13 or the RAID apparatus including the physical disks 12-1 through 12-m.

In accordance with the above-described embodiments, the copy process is performed from the physical disk 12-1 as a copy source to the physical disk 12-2 as a copy destination. The present invention is not limited to such an arrangement. Alternatively, the copy process may be performed from the copy source physical disk 12-1 to the same copy source physical disk 12-1. In this case, as well, the data from the physical disk 12-1 as the copy source is temporarily stored on the copy data buffer 20, and then the data from the copy data buffer 20 is written onto the physical disk 12-1 as the copy destination.

In accordance with the above-described embodiments, the data transfer process monitoring module 33 generally monitors the data transfer amounts of the second processors 17-1 through 17-m. The present invention is not limited to this arrangement. The data transfer process monitoring module 33 may be arranged for each port of the virtual switches 14 and 14a so that the data transfer amounts of the second processors 17-1 through 17-m are individually monitored.

In accordance with the above-described embodiments, the schedule information generators 30 and 30a determine whether the data transfer amount monitored by the data transfer monitoring module 33 is less than the predetermined value. The predetermined value may be any value equal to or larger than zero. The user may modify the predetermined value to a variety of forms by inputting the predetermined value on the management terminal 13 or the like.

The CPUs 21 and 21a and the management terminal 13 execute the schedule management program, thereby functioning as the virtual configuration information manager 29, the schedule information generators 30 and 30a, the priority determiner 31, the notifier 32, the data transfer process monitoring module 33, the re-schedulers 34 and 34a, and the interval re-calculator 35.

The program (schedule management program) for performing the functions of the virtual configuration information manager 29, the schedule information generators 30 and 30a, the priority determiner 31, the notifier 32, the data transfer process monitoring module 33, the re-schedulers 34 and 34a, and the interval re-calculator 35 may be provided in computer readable recording media. Such recording media include a flexible disk, CDs (CD-ROM, CD-R, CD-RW, etc.), DVDs (DVD-ROM, DVD-RAM, DVD-R, DVD+R, DVD-RW, DVD+RW, etc.), a magnetic disk, an optical disk, a magneto-optical disk, etc. A computer reads the program from such a recording medium, and transfers the program onto one of an internal recording device and an external recording device for storage. The program may be recorded on a recording device (recording medium) such as a magnetic disk, an optical disk, or a magneto-optical disk, and then the program may be supplied to the computer from the recording device via a communication line.

To perform the functions of the virtual configuration information manager 29, the schedule information generators 30 and 30a, the priority determiner 31, the notifier 32, the data transfer process monitoring module 33, the re-schedulers 34 and 34a, and the interval re-calculator 35, the program stored on the internal recording device is executed by a microprocessor in the computer. In this case, the program recorded on the recording medium may be read and executed by the computer.

In accordance with the second embodiment of the present invention, the frequency condition for the interval re-calculator 35 to re-calculate the interval is the predetermined number of times in comparison with the ahead-of-schedule count. The present invention is not limited to this method.

For example, a predetermined time h for determining whether the ahead-of-schedule process of the second processor 17 has been performed may be used. More specifically, if a unit copy operation is executed ahead of schedule once within the predetermined time h (10 minutes, for example), the interval re-calculator 35 may re-calculate the interval Ti based on the premise that the frequency condition is satisfied.

The number of calculations of the interval Ti by the interval re-calculator 35 is reduced. The workload on the CPU 21a is thus decreased.

In accordance with embodiments of the present invention, the computer includes hardware and an operating system and means the hardware operating under the control of the operating system. If the hardware is operated by an application program alone with the operating system unused, the hardware itself corresponds to the computer. The hardware includes, at least, a microprocessor such as a CPU, and means for reading a computer program recorded on the recording medium. In accordance with embodiments of the present invention, the virtual switch 14 and the management terminal 13 has the functions as the computer.

In addition to the flexible disk, the CD, the DVD, the magnetic disk, the optical disk, and the magneto-optical disk, described above, the recording media of embodiments of the present invention include an IC card, a ROM cartridge, a magnetic tape, a punch card, internal memories (such as RAM or ROM) of the computer, an external storage device, and a variety of computer readable media such as printed matter having bar code printed thereon.

In accordance with embodiments of the present invention, the first processor 15 connected to the host apparatus 11 and the second processor 17 connected to the physical disk 12 have been discussed as separate units. Alternatively, the first processor 15 may have the function of the second processor 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A method of controlling a switch apparatus connectable with a host and a storage device including first and second areas for storing data, comprising:
    establishing a schedule of copying at least part of data stored in the first area of the storage device into the second area of the storage device;
    monitoring a state of access by the host to the storage device;
    calculating a time interval during copying of the at least part of the data stored in the first area into the second area; and
    adjusting the schedule when determining, at a first time, the time interval is less than a predetermined value and copying a next portion of the at least part of the data from the first area at a rescheduled time interval ahead of the schedule, while maintaining the schedule as established for another portion of the at least part of the data at a second time.

2. The method according to claim 1, wherein the monitoring monitors the state of access based on an amount of data transferred between the host and each of the first area and the second area.

3. The method according to claim 1, comprising:
    storing, in a data buffer, the at least part of the data, where the copying further stores the at least part of the data into the data buffer.

4. The method according to claim 1, comprising:
    outputting error information when completion of the copying exceeds a period indicated in the schedule.

5. The method according to claim 1, comprising:
    re-calculating a period in the schedule by dividing the at least part of data into parts for plural copying operations.

6. The method according to claim 1, wherein the adjusting adjusts the schedule during the copying when the determining indicates the copying would exceed the time interval of the schedule for the copying and the monitored state of access indicates the copying is prioritized.

7. The method according to claim 1, wherein the establishing determines the schedule by dividing the data into parts for plural copying operations, dividing implementation of the copying into periods based on a number of the plural copying operations, and setting each of the periods to the parts of the data.

8. The method according to claim 7, wherein the dividing is based on an amount of data needed for copying the data to the storage device.

9. An information processing apparatus connected with a host, a first storage area and a second storage area, the information processing apparatus comprising:
a computer configured to communicate with the information processing apparatus that executes an operation including:
executing a copy process based on schedule information indicating a timing for copying data on the first area onto the second area split into a plurality of unit copy operations;
monitoring a data transfer amount of data transferred between the copy process and the host apparatus;
determining a time interval calculated during the copy process; and
re-scheduling the copying of data to be ahead of the timing indicated in the schedule information when determining, at a first time, the data transfer amount monitored exceeds a time interval of the schedule for the copy process and implementing the copy process at a rescheduled time interval, while maintaining the timing indicated in the schedule information for another portion of the at least part of the data at a second time.

10. The information processing apparatus according to claim 9, wherein the re-scheduling causes one of the plurality of unit copy operations to be performed ahead of schedule when determining the data transfer amount monitored is less than a predetermined value.

11. The information processing apparatus according to one of claim 9, wherein the re-scheduling causes each unit copy operation to be completed by the timing indicated by the schedule information generated prior to the re-schedule process even when the data transfer amount monitored is equal to or above the predetermined value.

12. The information processing apparatus according to one of claim 9, comprising:
a schedule information generator to generate the schedule information so that the unit copy operations are performed at predetermined intervals based on a specified operation time of the copy process, a size of data of the first storage area, and a size of unit data for the unit copy operation.

13. The information processing apparatus according to claim 9, comprising:
a notifier to notify of information related to the schedule information generated by the schedule information generator.

14. A switch apparatus connectable with a host and a storage device including first and second areas, the switch apparatus comprising:
a monitoring module monitoring a state of access by the host to the storage device; and
a copy processor copying at least part of data stored in the first area of the storage device into the second area of the storage device by establishing a schedule, and
where, when determining at a first time that the time interval calculated during of the copying of the at least part of the data stored in the first area into the second area is determined is less than a predetermined value, the copy processor adjusts the schedule to cause copying of a next portion of the at least part of the data from the first area at a rescheduled time ahead of the schedule, while maintaining the schedule as established for another portion of the at least part of the data at a second time.

15. The switch apparatus according to claim 14, wherein the monitoring module monitors the state of access based on amount of data transferred between the host and each of the first area and the second area.

16. The switch apparatus according to claim 14, wherein the switch apparatus includes a data buffer for storing the at least part of the data, the copying further stores the at least part of the data into the data buffer.

17. The switch apparatus according to claim 14, comprising:
outputting module configured to output error information when completion of the copying exceeds a period indicated in the schedule.

18. The switch apparatus according to claim 14, wherein the copy processor determines the schedule by dividing the data into parts for plural copying operations, dividing implementation of the copying into periods based on a number of the plural copying operations, and setting each of the periods to the parts of the data.

19. The switch apparatus according to claim 18, wherein the copy processor determines the schedule by dividing the data based on an amount of data needed for copying the data to the storage device.

* * * * *

UNITED STATES PATENT AND TRADEMARK OFFICE
CERTIFICATE OF CORRECTION

| | | |
|---|---|---|
| PATENT NO. | : 8,819,363 B2 | Page 1 of 1 |
| APPLICATION NO. | : 12/540473 | |
| DATED | : August 26, 2014 | |
| INVENTOR(S) | : Akira Satou et al. | |

It is certified that error appears in the above-identified patent and that said Letters Patent is hereby corrected as shown below:

In the claims

Column 27, lines 41-42, claim 11, after "to" delete "one of".
Column 27, lines 47-48, claim 12, after "to" delete "one of".
Column 28, line 19, claim 14, after "during" delete "of".

Signed and Sealed this
Eighteenth Day of November, 2014

Michelle K. Lee
*Deputy Director of the United States Patent and Trademark Office*